(12) United States Patent
Uchida et al.

(10) Patent No.: US 6,532,364 B1
(45) Date of Patent: Mar. 11, 2003

(54) MOBILE COMMUNICATION SYSTEM WITH DOWN-LINK FRAME NUMBERING

(75) Inventors: Yoshinori Uchida, Tokyo (JP); Hiroyuki Fujio, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/254,872

(22) PCT Filed: Sep. 30, 1997

(86) PCT No.: PCT/JP97/03492

§ 371 (c)(1),
(2), (4) Date: Mar. 15, 1999

(87) PCT Pub. No.: WO99/17469

PCT Pub. Date: Apr. 8, 1999

(51) Int. Cl.⁷ .................................. H04Q 7/20
(52) U.S. Cl. ................. 455/436; 370/347; 370/332; 370/342
(58) Field of Search ................. 370/329, 330, 370/331, 347, 345, 335, 342, 332, 333–334; 455/436, 439, 442, 437, 438, 443, 444

(56) References Cited

U.S. PATENT DOCUMENTS

| | | | | |
|---|---|---|---|---|
| 5,483,668 A | * | 1/1996 | Malkamaki et al. | 455/422 |
| 5,511,068 A | | 4/1996 | Sato | |
| 5,539,730 A | | 7/1996 | Dent | |
| 5,613,203 A | * | 3/1997 | Dupuy et al. | 455/436 |
| 5,729,531 A | * | 3/1998 | Raith et al. | 370/330 |
| 5,740,166 A | * | 4/1998 | Ekemark et al. | 370/331 |
| 5,787,346 A | * | 7/1998 | Iseyama | 455/439 |
| 5,862,132 A | * | 1/1999 | Blanchard et al. | 370/347 |
| 6,125,276 A | * | 9/2000 | Lupien | 455/436 |
| 6,128,322 A | * | 10/2000 | Rasanen et al. | 370/335 |
| 6,185,198 B1 | * | 2/2001 | LaDue | 370/329 |
| 6,333,923 B1 | * | 12/2001 | Maki et al. | 370/330 |
| 6,418,148 B1 | * | 7/2002 | Kumar et al. | 370/330 |

FOREIGN PATENT DOCUMENTS

| | | | |
|---|---|---|---|
| CA | 2246432 | 8/1997 | |
| EP | 0777396 | 6/1997 | |
| JP | 62886971 | 12/1986 | |
| JP | 8130766 | 5/1996 | |
| WO | WO 95/19079 | * 7/1995 | 370/330 |

* cited by examiner

*Primary Examiner*—Thanh Cong Le
*Assistant Examiner*—Lana Le
(74) *Attorney, Agent, or Firm*—Rothwell, Figg, Ernst & Manbeck

(57) ABSTRACT

In a mobile communication system which includes mobile switching centers (6 to 8) which have TDMA signals and time slot sharing and frequency channel sharing time divided CDMA signals and has a controlling function of allocating the signals on a time base and a frequency base and wherein mobile stations (15 to 33) are radio connected to radio base stations (11 to 31), connected to the mobile switching centers, by a multiple connection system and said mobile stations having a high speed data transmission function can be radio connected to the radio base stations also by high speed data channels, information of time slots in frames of down-links transmitted from two adjacent radio base stations to one mobile station is provided with serial numbers by the mobile switching centers to which the radio base stations are connected, and hand-over processing is performed based on the serial numbers.

31 Claims, 14 Drawing Sheets

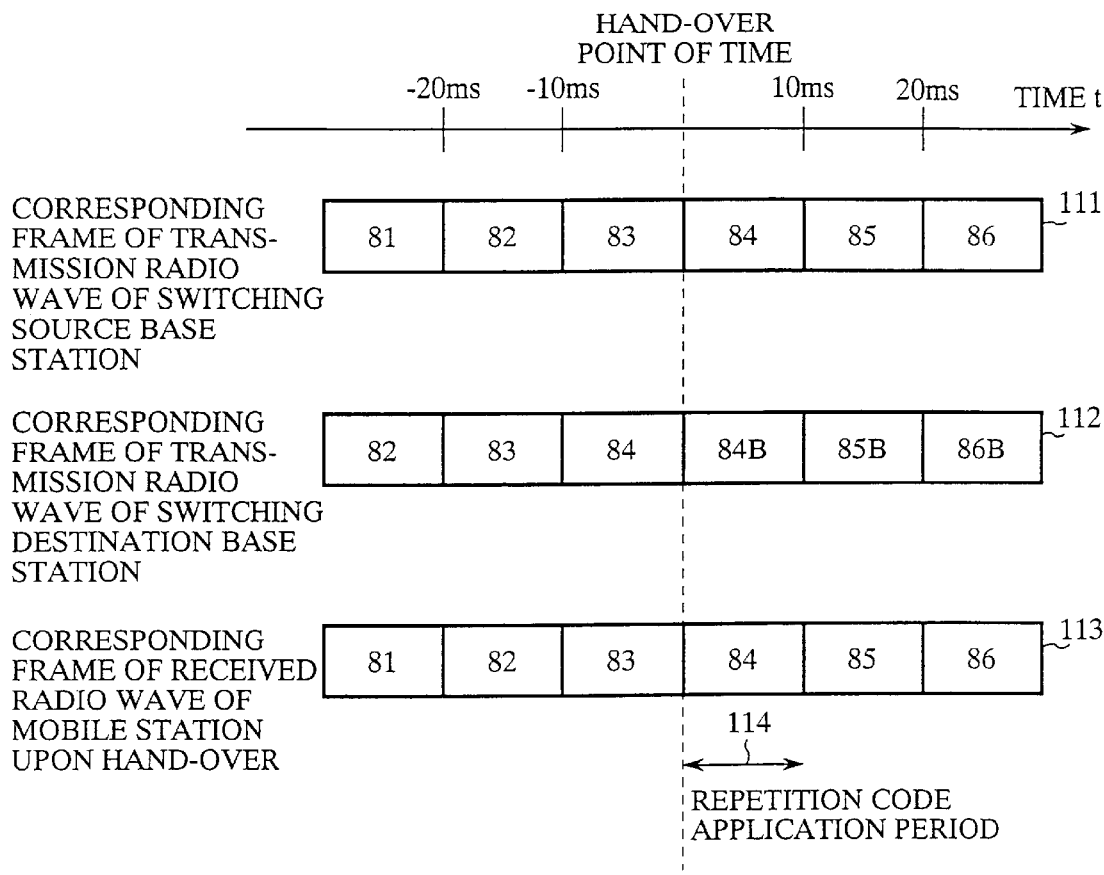
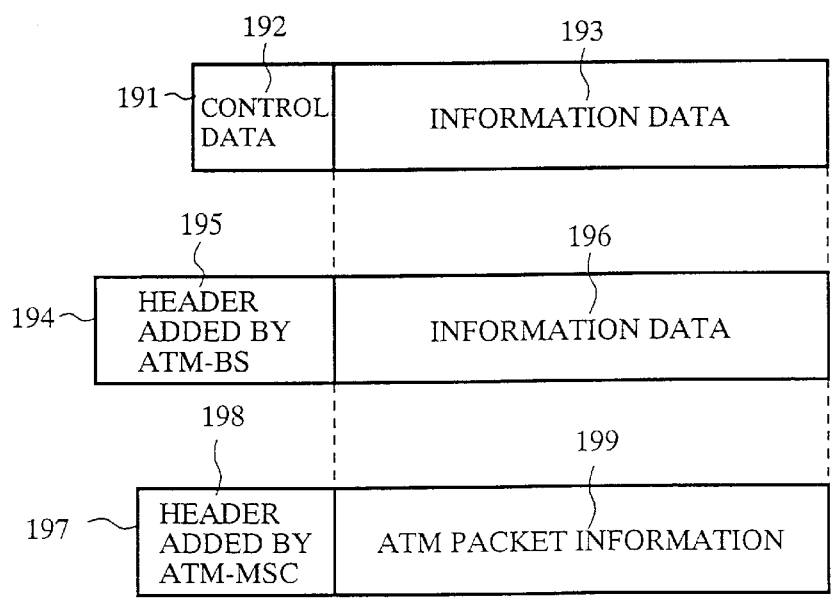

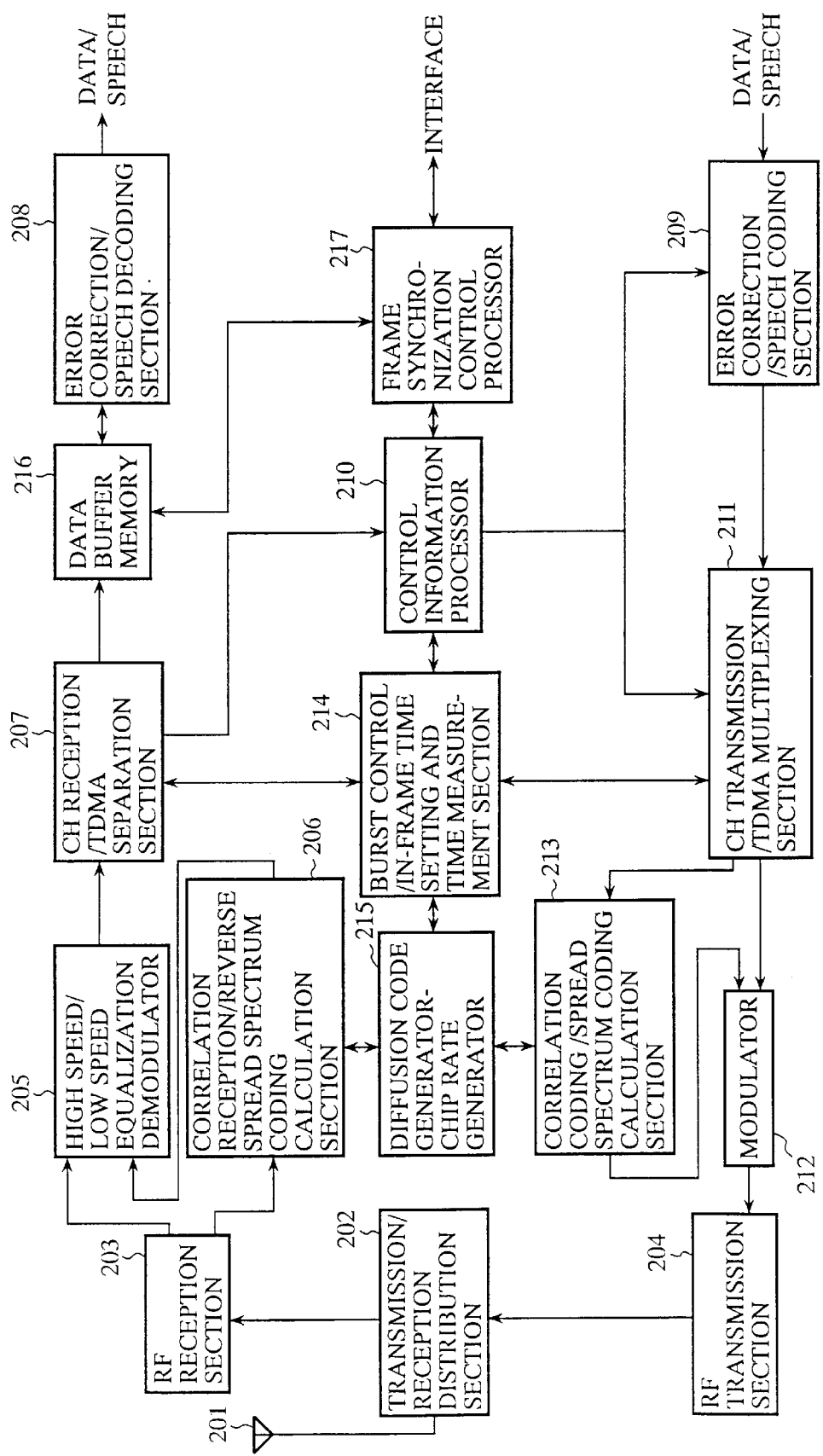

1

MOBILE COMMUNICATION SYSTEM WITH DOWN-LINK FRAME NUMBERING

TECHNICAL FIELD

This invention relates to a mobile-communication system which allows hand-over including a function by which a set of links including an up-link (Up-link) and a down-link (Down-link) having different communication capacities can be used as one communication channel (hereinafter referred to as an asymmetrical communication channel) using frequency channel sharing or time slot sharing in which a multiple connection system such as a TDMA (TDMA; Time divided Multiple Access; time divided multiple access) system or a time divided CDMA (CDMA; Code Division Multiple Access; code division multiple access) system is used.

BACKGROUND ART

A mobile communication system is principally composed of mobile stations such as, for example, mobile car-carried communication apparatus or mobile portable communication apparatus, and radio base stations which communicate with the mobile stations by radio channels. In such a mobile communication system as just described, sharing of the same radio frequency spectrum by different radio systems hereinafter referred to as frequency channel sharing) is sometimes effected between an FDMA (FDMA; Frequency Division Multiple Access; frequency division multiple access) system or a TDMA system and a CDMA system. It is to be noted that, in the CDMA system, frequency channel sharing between different codes has already been put into practical use. Further, hand-over in those systems is known already.

Here, a mobile communication system of time slot sharing wherein a TDMA signal and a time divided CDMA signal are shared in a same time slot is disclosed in the official gazette of Japanese Patent Laid-Open Application No. Hei 8-130766 already filed for patent separately and so forth. However, those documents do not describe an asymmetrical communication channel between up- and down-links or hand-over in high speed data transmission.

Meanwhile, a technique of a mobile communication system of time slot sharing and frequency channel sharing wherein a TDMA signal and a time divided CDMA signal are used in a same time slot and synchronization between radio base stations in which a semi-fixed communication apparatus (hereinafter referred to as WLL station) by a wireless local loop (Wireless Local Loop; hereinafter referred to as WLL) and so forth have already been filed for patent by Japanese Patent Application No. Hei 9-188356 and so forth. However, those documents do not recite an asymmetrical communication channel wherein an up-link and a down-link have different communication capacities or hand-over in high speed data transmission.

Furthermore, also a technique of a mobile communication system suitable for a multi-media radio environment having an asymmetrical communication channel is filed for patent separately by Japanese Patent Application No. Hei 9-164817. However, in the document, hand-over in high speed data transmission is not taken into consideration.

Meanwhile, as a mobile communication system wherein a plurality of CDMA signals are shared, U.S. Pat. No. 5,363,403 is known. However, the specification of the patent does not recite a method of handling a time divided CDMA signal. While also U.S. Pat. No. 5,511,068 is known as another mobile communication system, the document relates to an adaptive filter for a time divided CDMA signal system, and the specification of it recites neither that frequency channel sharing of a CDMA signal and a TDMA signal is performed in one time slot nor hand-over in high speed data transmission.

Further, as a document which handles hand-over, International Publication No. WO96/06512 is known. However, the invention of the document handles hand-over in a cellular (Cellular) communication system, and does not recite a case wherein time slot sharing of a time divided CDMA signal and a TDMA signal is performed in one time slot or a mobile communication system which has an asymmetrical communication channel.

Furthermore, as a document which relates to a communication system wherein a TDMA technique is applied to a CDMA communication system, also U.S. Pat. No. 5,410,568 is known. This patent places a synchronization code (Synchronization-code) at the top of a frame of CDMA communication, that is, at the top of a burst, but does not introduce a time divided CDMA system using a TDMA control channel in order to effect frame synchronization setting, nor recites coexistence with a TDMA system. In other words, the patent does not intend sharing between a TDMA system and a time divided CDMA system using a TDMA frame. Further, in this patent, no attention is paid at all to a communication channel wherein the communication capacities of an up-link and a down-link are asymmetrical, and hand-over in high speed data transmission is not recited either.

It is to be noted that, in addition to the documents mentioned above, the official gazette of Japanese Patent Laid-Open Application No. Hei 6-22364, the official gazette of Japanese Patent Laid-Open Application No. Hei 7-322332, the official gazette of Japanese Patent Laid-Open Application No. Hei 8-154269, the official gazette of Japanese Patent Laid-Open Application No. Hei 8-280056 and so forth are known.

However, while the official gazette of Japanese Patent Laid-Open Application No. Hei 6-22364 mentioned above discloses a technique of hand-over for a TDMA cellular system, it is quite silent about an asymmetrical channel wherein an up-link and a down-link have different transmission capacities or a matter regarding hand-over in high speed data transmission.

In the meantime, while the official gazette of Japanese Patent Laid-Open Application No. Hei 7-322332 discloses a technique regarding reception of other base station signals in a silence period in a cellular system of the FDMA system, the TDMA system or the CDMA system or hand-over based on such reception, it does not recite an asymmetric channel wherein an up-link and a down-link have different transmission capacities or hand-over in high speed data transmission.

On the other hand, while the official gazette of Japanese Patent Laid-Open Application No. Hei 8-154269 discloses a technique wherein, in a mobile communication system, strengths of radio signals from radio base stations are measured and order numbers are applied to the radio signals in the descending order of the radio signal strengths and then the order is correlated with the order of hand-over and a candidate for hand-over is selected based on the correlation, it does not recite a communication system of an asymmetric channel wherein an up-link and a down-link have different transmission capacities or hand-over in high speed data transmission.

Further, while the official gazette of Japanese Patent Laid-Open Application No. Hei 8-280056 discloses a technique wherein, in a cellular system of the TDMA system or the CDMA system, a data buffer is provided in a radio base station and synchronism is established between the radio base station and an adjacent base station to realize instantaneous disconnection-free hand-over, it does not recite mobile communication having an asymmetric channel wherein an up-link and a down-link have different transmission capacities or hand-over in high speed data transmission.

Such various mobile communication systems which include one or more radio base stations which communicate with a plurality of mobile stations by radio channels and use the TDMA system and the time divided CDMA system as described above are conventionally known. Also in such mobile communication systems as described above, the demand for introduction of high speed data transmission is increasing. However, a mobile communication system which can sufficiently meet the demand has not been realized as yet.

Also it is demanded to introduce a communication channel wherein an up-link and a down-link have different communication capacities in order to make a mobile communication system cope with multi-media.

Furthermore, also in such a mobile communication system as described above, it is necessary to introduce hand-over means for allowing smooth hand-over in high speed data transmission.

The present invention has been made to solve such problems as described above. It is an object of the present invention to introduce high speed data channels into a TDMA signal and time divided CDMA signal coexisting mobile communication system and to realize a mobile communication system of the type wherein communication links wherein an up-link and a down-link have different communication capacities are allocated as a set of communication channels, which allows hand-over and copes with multi-media.

DISCLOSURE OF THE INVENTION

A mobile communication system according to the present invention is constructed such that it includes a mobile switching center which has TDMA signals and time slot sharing and frequency channel sharing time divided CDMA signals and has a controlling function of allocating the signals on a time base and a frequency base, and mobile stations and a radio base station or stations connected to the mobile switching center are radio connected to each other by a multiple connection system such that information of time slots in frames of down-links transmitted from two adjacent ones of the radio base stations to one of the mobile stations has serial numbers provided by the mobile switching center to which the radio base stations are connected. By this construction, hand-over between radio base stations can be realized by a unified process based on the serial numbers.

A mobile communication system according to the present invention is constructed such that each of the mobile stations has a function of detecting serial numbers included in information of time slots in frames of two down-links transmitted thereto from two radio base stations.

A mobile communication system according to the present invention is constructed such that the mobile switching center has a function of repetitively setting serial numbers included in information of time slots in a frame of a signal transmitted from the mobile switching center to a radio base station for each multi-frame number of a radio channel or for each integral number of times the multi-frame number.

A mobile communication system according to the present invention is constructed such that each of the mobile stations has a function of receiving, detecting and comparing serial numbers included in information of time slots in a frame of a signal being transmitted from the radio base station (switching source base station) with which the mobile station is communicating and serial numbers included in information of time slots in a frame of a signal being transmitted from the radio base station (switching destination base station) to which the communication is to be re-connected as a result of a movement of the mobile station, producing a repetition code based on difference information between the two serial numbers and transmitting the repetition code to the mobile switching center via the switching source base station.

A mobile communication system according to the present invention is constructed such that the repetition code is a negative number when the signal transmitted from the switching destination base station arrives later than the signal transmitted from the switching source base station, but the repetition code is a positive number when the signal transmitted from the switching destination base station arrives earlier than the signal transmitted from the switching source base station.

A mobile communication system according to the present invention is constructed such that each of the mobile stations has a function of receiving, detecting and comparing, upon hand-over, serial numbers included in information of time slots in a frame of a signal being transmitted from the switching source base station and serial numbers included in information of time slots in a frame of a signal being transmitted from the switching destination base station, and abandoning, when the signal transmitted from the switching destination base station arrives later than the signal transmitted from the switching source base station, information in a number of time slots of a signal received newly from the switching destination base station upon hand-over equal to a number indicated by contents of a repetition code based on difference information between the two serial numbers. By this construction, adjustment of an information delay when the signal of the switching destination base station arrives later than the signal of the switching source base station is performed by the mobile station, and discontinuity of information which occurs upon hand-over can be eliminated readily.

A mobile communication system according to the present invention is constructed such that an switching center of the ATM type is used for the mobile switching center, and the mobile switching center has a function of realizing numbering of serial numbers included in information of time slots in a frame by newly adding a header to the top of an ATM packet.

A mobile communication system according to the present invention is constructed such that the mobile switching center has a function of constructing, when the number of information bits which can be transmitted by one time slot of a radio channel is smaller than the number of information bits for one packet of public network packets transmitted by a public network, packets each having information obtained by dividing information of the public network packets for each time slot information bit of the radio channel and transmitting the packets to a radio base station.

A mobile communication system according to the present invention is constructed such that the mobile switching center has a packet information amount variation function of transmitting, when the number of information bits which can be transmitted by one time slot of a radio channel is larger than the number of information bits for one packet of public network packets, information of the public network packets as it is to a radio base station without dividing the information of the public network packets.

A mobile communication system according to the present invention is constructed such that an switching center interface of each of the radio base stations is of the ATM type.

A mobile communication system according to the present invention is constructed such that each of the mobile stations has a function of receiving, detecting and comparing, upon hand-over, serial numbers included in information of time slots in a frame of a signal being transmitted from a switching source base station and serial numbers included in information of time slots in a frame of a signal being transmitted from a switching destination base station and producing a repetition code based on difference information between the two serial numbers, and each of the radio base stations has a function of holding, when the radio base station becomes the mobile destination base station, if the signal transmitted arrives earlier than the signal transmitted from the switching source base station, information in a number of time slots of the signal transmitted to the mobile station already equal to a number indicated by contents of the repetition code in response to an instruction of the repetition code upon hand-over, and successively transmitting, simultaneously with hand-over, signals to the mobile station beginning with the held information of the time slots. By this construction, when the signal of the switching destination base station arrives earlier than the signal from the switching source base station, the switching destination base station re-sends information of the last time slot of the preceding frame by a number indicated by contents of the repetition code to make the delays of information from the radio base stations at the mobile station equal to each other, and consequently, discontinuity of information which arises upon hand-over can be eliminated readily.

A mobile communication system according to the present invention is constructed such that it includes a mobile switching center which has TDMA signals and time slot sharing and frequency channel sharing time divided CDMA signals and has a controlling function of allocating the signals on a time base and a frequency base, and mobile stations and a radio base station or stations connected to the mobile switching center are radio connected to each other by a multiple connection system while the mobile stations having a high speed data transmission function can be radio connected to the radio base stations also by high speed data channels such that information of time slots of the high speed data transmission channels being transmitted in each time slot in frames of two down-links transmitted from two adjacent ones of the radio base stations to one of the mobile stations has serial numbers provided by the mobile switching center to which the radio base stations are connected. By this construction, hand-over between radio base stations upon high speed data transmission can be realized by a unified process based on the serial numbers.

A mobile communication system according to the present invention is constructed such that each of the mobile stations has a function of detecting serial numbers included in information of micro slots of high speed data transmission channels transmitted in each time slot in frames of two down-links transmitted thereto from two radio base stations.

A mobile communication system according to the present invention is constructed such that the mobile switching center has a function of repetitively setting serial numbers included in information of micro slots of high speed data transmission channels transmitted in each time slot in a frame of a signal transmitted from the mobile switching center to a radio base station for each multi-frame number of a radio channel or for each integral number of times the multi-frame number.

A mobile communication system according to the present invention is constructed such that each of the mobile stations has a function of receiving, detecting and comparing serial numbers included in information included in a number of micro slots of a high speed data transmission channel transmitted in each time slot in a frame of a signal being transmitted from a switching source base station and serial numbers included in information included in a number of micro slots of a high speed data transmission channel transmitted in each time slot in a frame of a signal being transmitted from a switching destination base station, producing a repetition code based on difference information between the two serial numbers and transmitting the repetition code to the mobile switching center via the switching source base station.

A mobile communication system according to the present invention is constructed such that each of the mobile stations has a function of receiving, detecting and comparing, upon hand-over, serial numbers included in information of micro slots of a high speed data transmission channel transmitted in each time slot in a frame of a signal being transmitted from a switching source base station and serial numbers included in information of micro slots of a high speed data transmission channel transmitted in time slots in a frame of a signal being transmitted from a switching destination base station and abandoning, when the signal transmitted from the switching destination base station arrives later than the signal transmitted from the switching source base station, information of a number of micro slots of a signal received newly from the switching destination base station upon hand-over equal to a number indicated by contents of a repetition code based on difference information between the two serial numbers. By this construction, adjustment of an information delay when the signal of the switching destination base station upon high speed data transmission arrives later than the signal of the switching source base station is performed by the mobile station, and continuity of information which arises upon hand-over in high speed data transmission can be eliminated readily.

A mobile communication system according to the present invention is constructed such that each of the mobile stations has a function of receiving, detecting and comparing, upon hand-over, serial numbers included in information of micro slots- of a high speed data transmission channel transmitted in each time slot in a frame of a signal being transmitted from a switching source base station and serial numbers included in information of micro slots of a high speed data transmission channel transmitted in each time slot in a frame of a signal being transmitted from a switching destination base station and producing a repetition code based on difference information between the two serial numbers, and each of the radio base stations has a function of holding, when the radio base station becomes the mobile destination base station upon hand-over of the mobile station, if the signal transmitted therefrom arrives earlier than the signal transmitted from the switching source base station, information of a number of micro slots of the signal transmitted to the mobile station already equal to a number indicated by contents of the repetition code in response to an instruction of the repetition code upon hand-over, and successively transmitting, simultaneously with hand-over, signals to the mobile station beginning with the held information of the micro slots. By this construction, when the signal of the switching destination base station upon high speed data transmission arrives earlier than the signal from the switching source base station, the switching destination base station re-sends information of the last micro slots of the preceding frame by a number indicated by contents of the repetition code to make the delays of information from the radio base stations at the mobile station equal to each other, and consequently, discontinuity of information which arises upon hand-over in high speed data transmission can be eliminated readily.

A mobile communication system according to the present invention is constructed such that the mobile switching center has a function of transmitting a repetition code from a mobile station received via the switching source base station to the switching destination base station simultaneously with determination of hand-over.

A mobile communication system according to the present invention is constructed such that it includes a mobile switching center which has TDMA signals and time slot sharing and frequency channel sharing time divided CDMA signals and has a controlling function of allocating the signals on a time base and a frequency base, and mobile stations and a radio base station or stations connected to the mobile switching center are radio connected to each other by a multiple connection system while each of the radio base stations has a function of applying, when the radio base station is to transfer information included in a time slot received from one of the mobile stations to the mobile switching center, a serial number associated with a multi-frame of a radio channel to the information from the mobile station. By this construction, the mobile switching center can discriminate the order of information transmitted by the mobile station, and it can be eliminated that, upon hand-over, the order of information to be transmitted from the mobile switching center to a public network is mistaken.

A mobile communication system according to the present invention is constructed such that the mobile switching center has a function of detecting serial numbers included in information of a time slot transferred from a radio base station thereto and associated with a multi-frame of a radio channel.

A mobile communication system according to the present invention is constructed such that each of the radio base stations has a function of setting serial numbers included in information of a time slot transferred from a radio base station thereto and associated with a multi-frame of a radio channel repetitively for each multi-frame number of the radio channel or for each integral number of times the multi-frame number.

A mobile communication system according to the present invention is constructed such that each of the radio base stations has a function of adding serial numbers included in information of a time slot transferred to the mobile switching center and associated with a multi-frame of a radio channel as a header to the top of an information packet to be transferred to the mobile switching center.

A mobile communication system according to the present invention is constructed such that the mobile switching center has a function of checking, upon hand-over, serial numbers included in headers of information packets transferred thereto from two radio base stations and transferring the information packets in order to a public network so that the serial numbers may be arranged in a correct order.

A mobile communication system according to the present invention is constructed such that a mobile station employed therein includes storage means for storing information included in a time slot received from a radio base station or information included in micro slots in the time slot, and control means for controlling, upon -hand-over, the storage means to abandon information stored therein by a number designated by contents of a repetition code. By this construction, when hand-over is to be performed, since it is only required to set the storage means and the control means for controlling the storage means with contents of the repetition code, hand-over control when a signal of a switching source base station arrives later than a signal of a switching destination base station can be performed readily in the mobile station.

A mobile communication system according to the present invention is constructed such that a radio base station employed therein includes storage means for storing information included in a time slot transmitted therefrom immediately prior to hand-over or information included in micro slots in the time slot, and control means for controlling the storage means to store information transmitted immediately prior to the hand-over by a number designated by contents of a repetition code and re-send the information stored in the storage means upon the hand-over. By this construction, also when the information of the switching destination base station arrives earlier than the information of the switching source base station, it can be prevented that, upon hand-over, a mobile station receives continuous information while the information partially drops.

A mobile communication system according to the present invention is constructed such that it includes a mobile switching center which has TDMA signals and time slot sharing and frequency channel sharing time divided CDMA signals and has a controlling function of allocating the signals on a time base and a frequency base, and mobile stations and a radio base station or stations connected to the mobile switching center are radio connected to each other by a multiple connection system while the mobile switching centers are directly connected to each other by an additional communication line without having the public network interposed therein. By this construction, by performing setting of a header which passes through the additional communication line which directly connects the mobile switching centers to each other and the mobile switching centers, occurrence of hand-over can be made independent of the public network.

A mobile communication system according to the present invention is constructed such that, when hand-over between a switching source base station and a switching destination base station connected to mobile switching centers different from each other is performed, information from the switching destination base station which is communicating with a mobile station after the hand-over is performed is transmitted from the mobile switching center to which the switching destination base station is connected to the public network via the additional communication line and the mobile switching center to which the switching source base station is connected.

A mobile communication system according to the present invention is constructed such that, after the communication of the information from the switching destination base station which is transmitted from the mobile switching center to which the switching destination base station is connected to the public network via the additional communication line and the mobile switching center to which the switching source base station is connected comes to an end once, when the communication is to be resumed, the information from the mobile station is directly transmitted from the switching destination base station to the public network via the mobile switching center to which the switching destination base station is connected.

A mobile communication system according to the present invention is constructed such that a plurality of mobile switching centers connected by the additional communication line belong to different operators from each other. Also hand-over between radio base stations connected to mobile switching centers which belong to different operators from each other in this manner can be treated similarly to hand-over between radio base stations which belong to a same operator.

A mobile communication system according to the present invention is constructed such that an switching center of the ATM type is used for the plurality of mobile switching centers connected to each other by the additional communication line.

A mobile communication system according to the present invention is constructed such that the additional communication line by which the plurality of mobile switching centers are connected to each other is of the ATM type.

A mobile communication system according to the present invention is constructed such that, when a mobile station is still busy after handed over between a plurality of radio base stations which belong to a plurality of mobile switching centers, information -from a switching destination base station which is communicating with the mobile station at present is transmitted from the mobile switching center to which a switching source base station is connected to the public network via the plurality of mobile switching centers and a plurality of additional communication lines by which the plurality of mobile switching centers are connected to each other passing the mobile switching center to which the switching destination base station.

BRIEF DESCRIPTION OF DRAWINGS

FIG. 7 is a diagrammatic view illustrating an example of an information transmission time difference which relies upon a transmission route difference between adjacent radio base stations upon hand-over in Embodiment 2 of the present invention;

FIG. 12 is a diagrammatic view illustrating a structure of an ATM packet and radio channel information by Embodiment 5 of the present invention;

FIG. 13 is a block diagram showing a construction of a mobile station by Embodiment 6 of the present invention;

BEST MODES FOR CARRYING OUT THE INVENTION

In the following, in order to describe the present invention in more detail, best modes for carrying out the present invention are described with reference to the accompanying drawings.

Embodiment 1

Figure 1:
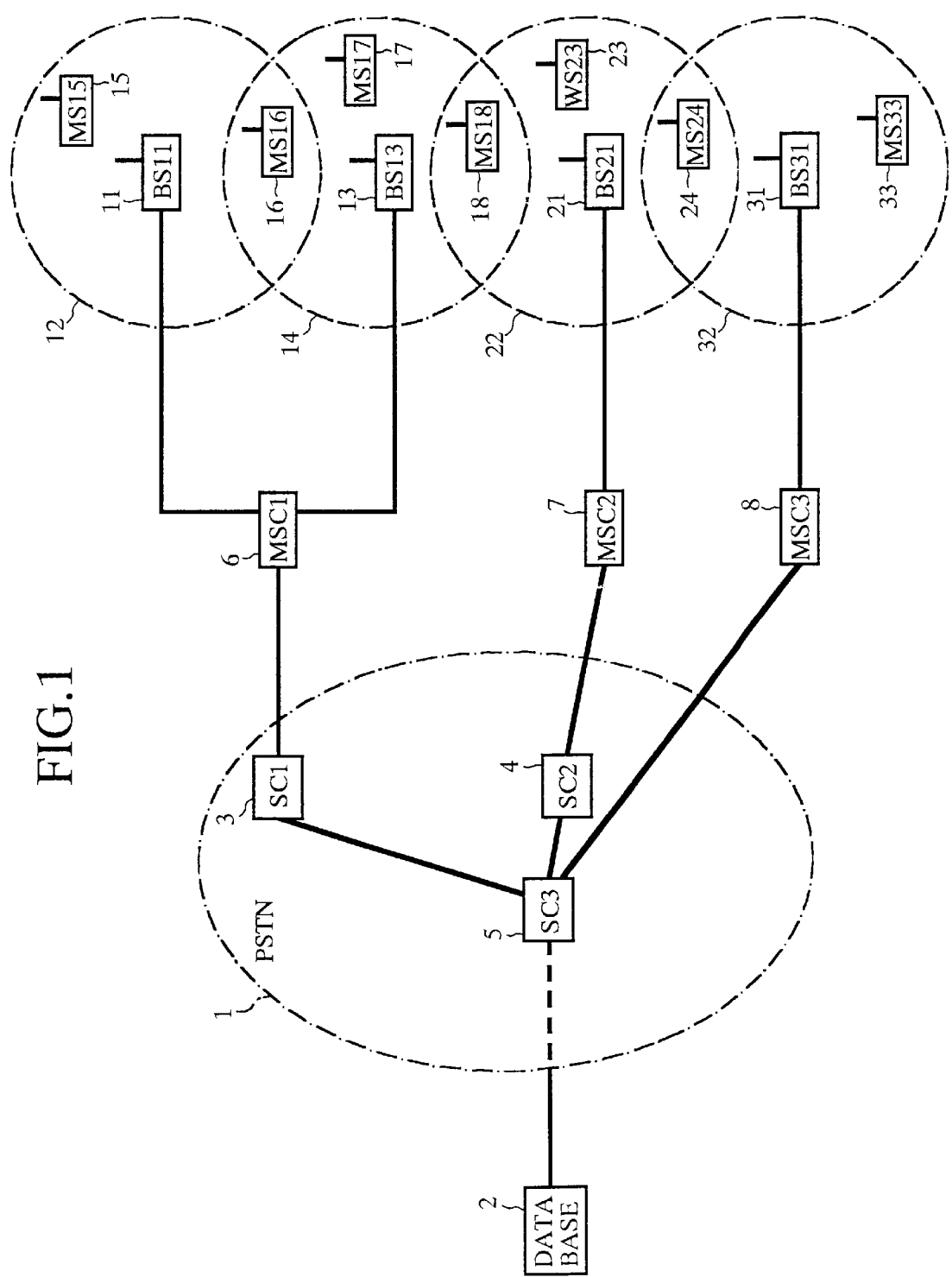
FIG. 1 is a system diagram showing an entire construction diagram of a mobile communication system according to Embodiment 1 of the present invention.

FIG. 1 is a system diagram showing an entire construction diagram of a mobile communication system to which a time slot sharing and frequency channel sharing system according to the present invention is applied and shows an embodiment wherein information from a radio base station (hereinafter referred to as switching destination base station) which is a destination of hand-over of a mobile station arrives later than information from another radio base station (hereinafter referred to as switching source radio base station) with which the mobile station is communicating first.

Referring to FIG. 1, reference numeral 1 denotes a public service telephone network (PSTN), 2 a data base accommodated in the public network 1, and reference numerals 3, 4 and 5 denote switching centers which belong to the public network 1. Reference numerals 6, 7 and 8 denote each a mobile switching center (MSC), which has TDMA signals and time slot sharing and frequency channel sharing (including a case wherein a frequency is not shared) time divided CDMA signals and has a control function of allocating those signals on a time base and a frequency base. The mobile switching center 6 is wire connected to the switching center 3 of the public network 1, the mobile switching center 7 to the switching center 4, and the mobile switching center 8 to the switching center 5.

Reference numerals 11, 13, 21 and 31 denote each a radio base station (BS), and the radio base stations 11 and 13 are connected to the mobile switching center 6, the radio base station 21 to the mobile switching center 7, and the radio base station 31 to the mobile switching center 8 such that they are controlled by the respective mobile switching centers (MSC). Reference numerals 12, 14, 22 and 32 denote radio covering areas (hereinafter referred to as cells) formed by the radio base stations 11, 13, 21 and 31, respectively. The cell 12 is formed by the radio base station 11, the cell 14 by the radio base station 13, the cell 22 by the radio base station 21, and the cell 32 by the radio base station 31.

Reference numerals 15, 16, 17, 18, 24 and 33 denote ordinary mobile stations (MS) which communicate with the radio base stations 11, 13, 21 and 31 which form the cells 12, 14, 22 and 32 in which the mobile stations 15, 16, 17, 18, 24 and 33 are present and may each be a mobile communication apparatus of the conventional type which principally performs speech communication such as a mobile car-carried communication apparatus or a mobile portable communication apparatus, a mobile communication apparatus for multimedia which principally performs data communication or a like apparatus. Reference numeral 23 denotes a semi-fixed WLL station (WS) which communicates with the radio base station 21 by a radio channel. Those ordinary mobile stations (MS) and WLL station (WS) communicate with the radio base stations (BS) by medium/high speed TDMA channels and have a function of performing speech or low speed data communication by time divided CDMA channels and low speed TDMA data channels in addition to the medium/high speed TDMA channels. Those ordinary mobile stations (MS) and WLL station (WS) are hereinafter referred to generally as mobile stations.

Here, the mobile stations including the ordinary mobile stations 15 to 33, WLL station 23 and so forth and the radio base stations 11 to 31 communicate signals by communication channels modulated by a digital modulation system and are radio connected to each other by an FDMA/TDD (TDD; Time Division Duplex; time division duplex communication) system or a CDMA/TDD system or by a multi-carrier TDMA/FDD (FDD; Frequency Division Duplex; frequency division duplex communication) system, a TDMA/TDD system, a time divided CDMA/FDD system, a time divided CDMA/TDD system and so forth.

Figure 2:
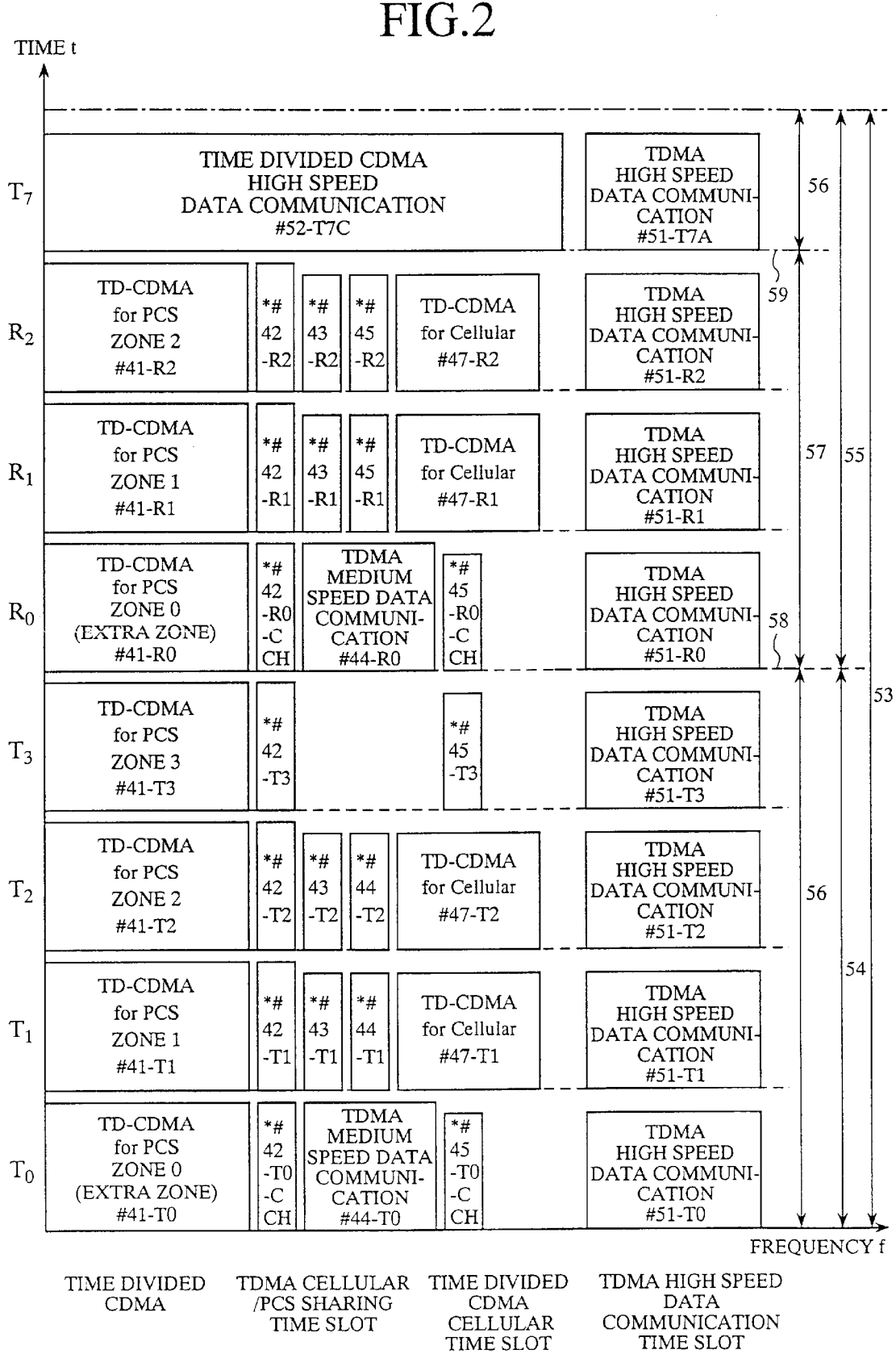
FIG. 2 is a diagrammatic view illustrating a time slot construction for a personal communication system (Personal Communication System; hereinafter referred to as PCS) by time divided CDMA and cellular in Embodiment 1 mentioned above.

FIG. 2 is a diagrammatic view illustrating a time slot construction for a PCS by time divided CDMA and cellular, and shows an example wherein a down-link T7 is added to a mobile communication system wherein the transmission capacities of an up-link and a down-link in high speed TDMA data transmission or the like are asymmetrical.

Referring to FIG. 2, reference symbols #41-T0/R0 to #41-T2/R2 and #41-T3 denote time slots for a PCS, and #47-T1/R1 to #47-T2/R2 denote time slots for a cellular. Meanwhile, reference symbol #44-T0/R0 denotes a time slot for TDMA medium speed data communication, reference symbols #51-T0/R0 to #51-T2/R2, #51-T3 and #51-T7A denote time slots for TDMA high speed data communication, and reference symbol #52-T7C denotes a time slot for time divided CDMA high speed data communication. It is to be noted that the other time slots #42-T0/R0 to #42-T2/R2 and #42-T3, #43-T1/R1 and #43-T2/R, #43-T1 and #43-T2, #45-T0/R0, #45-R1 to #45-R2, and #45-T3 for low speed TDMA to which the mark * is added illustrate examples wherein they are used as speech data or low speed data or else control channels.

It is to be noted that, in the example shown in FIG. 2, the five time slots T0 to T3 and T7 are allocated to down-links from the radio base stations 11 to 31 to the mobile stations 15 to 33 while the three time slots R0 to R2 are allocated to up-links from the mobile stations 15 to 33 to the radio base stations 11 to 31. In this manner, an asymmetric TDD system wherein an up-link and a down-link have different communication capacities is formed.

Further, in FIG. 2, reference numeral 53 denotes one frame length, and reference numerals 54 and 55 denote each one half frame length. Reference numeral 56 denotes a down time slot length from the radio base stations 11 to 31 to the mobile stations 15 to 33 in high speed data communication, and 57 denotes an up-link slot length from the mobile stations 15 to 33 to the radio base stations 11 to 31 in high speed data communication. Reference numerals 58 and 59 denote each a line in a frame time-frequency base which makes a boundary between down-links from the radio base stations 11 to 31 to the mobile stations 15 to 33 and up-links from the mobile stations 15 to 33 to the radio base stations 11 to 31.

Figure 3:
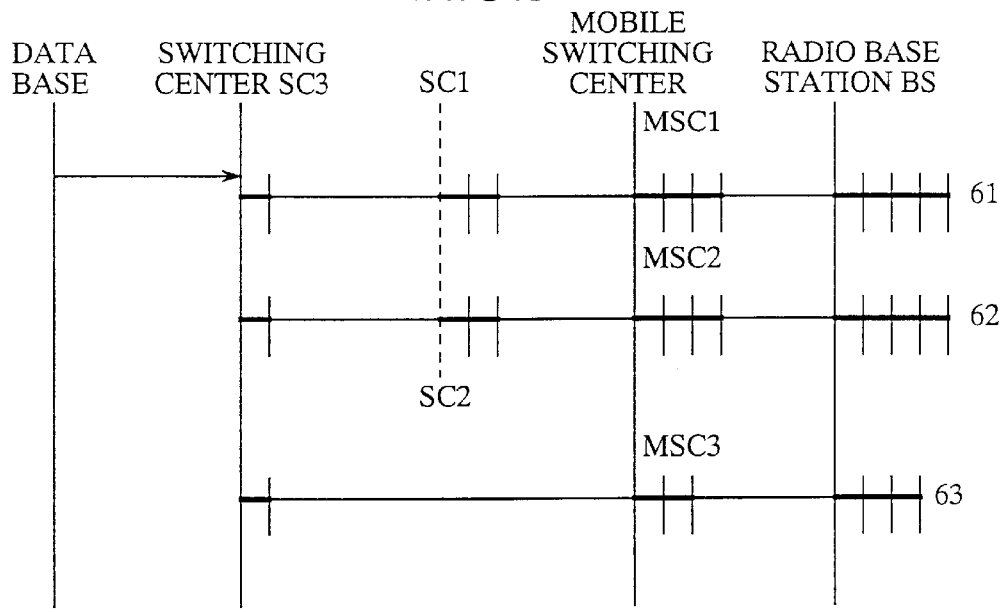
FIG. 3 is a diagrammatic view illustrating an example of unevenness in delay time in Embodiment 1 mentioned above.

FIG. 3 is a diagrammatic view illustrating an example of unevenness in delay time according to an example of wire lines from the data base 2 to the radio base stations 11 to 31 and an arrangement of the switching centers 3 to 5 of the public network 1 and illustrates an example wherein, as a same signal transmitted from the one data base 2 passes different routes from each other, the delay times until the signal arrives at a radio base station are different. In particular, as shown in FIG. 3, since the number of times by which a signal 63 passes an switching center (SC) in the public network 1 is smaller by one comparing with those of the other signals 61 and 62, it is considered that the arriving time of the signal exhibits a difference. Accordingly, also in a communication system wherein frame synchronism is established between radio base stations (BS), in order for a mobile station to be handed over between radio base stations (BS), a function of confirming what degree the difference in signal arriving time between the radio base stations (BS) is required.

In the following, this function is described.

It is to be noted that a system which performs, in a mobile communication system which uses such a TDMA system and time divided CDMA system and so forth as described above, measurement of a synchronization time difference in frame synchronization between base stations in units of a time divided CDMA chip rate has been filed for patent by Japanese Patent Application No. Hei 9-191090. In this system, a time difference other than a fixed time difference between the top time position of a time divided CDMA burst signal received from a radio base station by a mobile station and the top time position of a time divided CDMA burst signal transmitted in accordance with an instruction of the radio base station so that the top may arrive at the radio base station at the top time position of a time slot is calculated in units a chip rate which is used in time divided CDMA communication to measure a synchronization time displacement.

Figure 4:
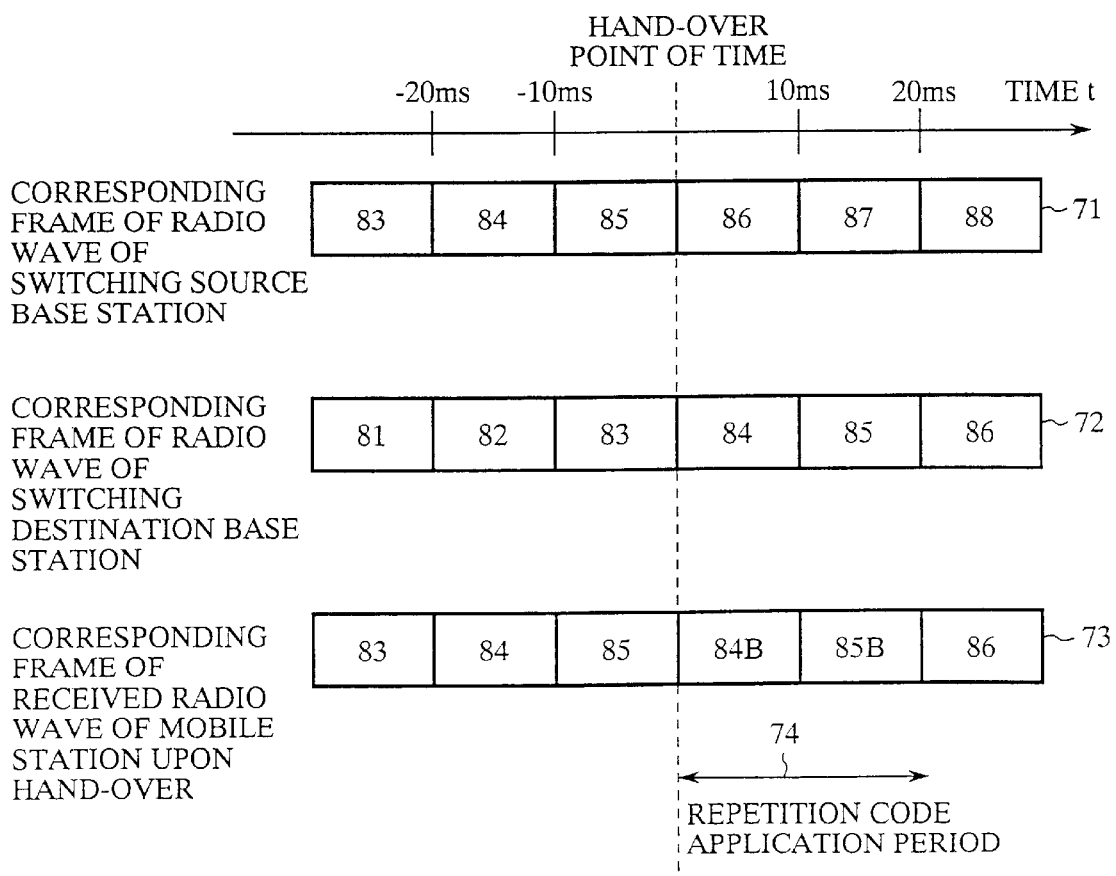
FIG. 4 is a diagrammatic view illustrating an example of an information transmission time difference which relies upon a transmission route difference between adjacent radio base stations upon hand-over in Embodiment 1 mentioned above.

FIG. 4 is a diagrammatic view illustrating an example of an information transmission time difference which relies upon a transmission route difference between adjacent radio base stations upon hand-over. Referring to FIG. 4, reference numeral 71 denotes a corresponding frame of a radio wave of a switching source base station, and 72 a corresponding frame of a radio wave of a switching destination base station, and for each frame, serial numbers of 81, 82, 83, 84, . . . are applied by a mobile switching center. Reference numeral 73 denotes a corresponding frame of a received radio wave of the mobile station upon hand-over, and 74 denotes a repetition code application period in which a repetition code (Repetition Code) which is number difference information between the serial numbers of the corresponding frame 71 of a radio wave of the switching source base station and the serial numbers of the corresponding frame 72 of a radio wave of the switching destination base station.

Figure 5:
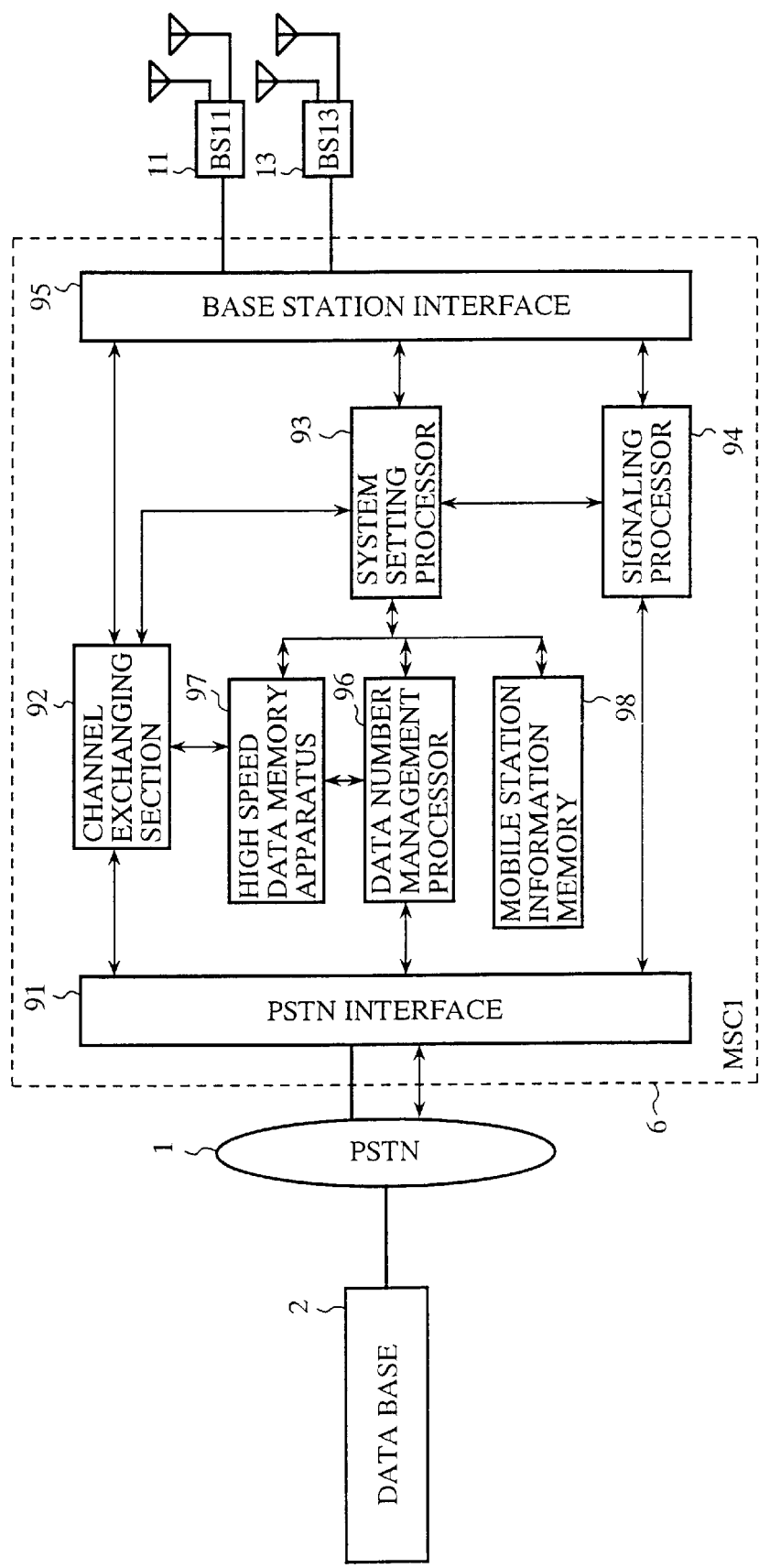
FIG. 5 is a block diagram showing a construction of a mobile switching center having a function of providing serial numbers for each frame in Embodiment 1 mentioned above.

FIG. 5 is a block diagram showing a construction of a mobile switching center having a function of applying the serial numbers described above for each frame. Referring to FIG. 5, reference numeral 6 denotes a mobile switching center (MSC1) which is shown in FIG. 1 with the same reference numeral applied thereto, reference numerals 11 and 13 denotes radio base centers (BS11 and BS13) connected to the mobile switching center 6, reference numeral 1 denotes a public network (PSTN) in which the mobile switching center 6 is accommodated, and 2 a data base connected to the public network 1.

Further, in the mobile switching center 6, reference numeral 91 denotes a PSTN interface which performs transmission and reception of information to and from the public network 1 and transmission and reception of signaling signals such as a dial signal, charging information, password information and so forth, and 92 a channel exchanging section which transmits information from the public network 1 to the radio base station 11 or 13 which forms a cell in which a mobile station of a destination is present and transmits information transmitted thereto from a mobile station via the radio base station 11 or 13 to the public network 1. Reference numeral 93 denotes a system setting processor which selects a radio system by which the radio base station 11 or 13 and a mobile station are to be connected to each other and instructs so that the selected radio system may be set to the radio base station 11 or 13 and the mobile station, and 94 a signaling processor which processes a number of a mobile station to be connected, a password procedure for charging and so forth. Reference numeral 95 denotes a base station interface which communicates information to be transmitted to a mobile station via the radio base station 11 or 13, signaling information with a mobile station, system information which defines radio connection and so forth with the radio base station 11 or 13.

Reference numeral 96 denotes a data number management processor which performs, simultaneously with starting of a hand-over process, allocation of serial numbers in units of a frame or in units of a packet to information of radio waves transmitted from the two radio base stations 11 and 13, and this numbering function by the data number management processor 96 is a new function of this mobile switching center which takes hand-over into consideration. Reference numeral 97 denotes a high speed data memory apparatus which temporarily stores, when a mobile station is to be connected to the data base 2, high speed data communicated between the mobile station and the data base 2. Reference numeral 98 denotes a mobile station information memory in which mobile station information of mobile stations which are managed by the mobile switching center 6, that is, mobile stations which belong to the mobile switching center 6 or mobile stations which currently stay in cells of radio base stations managed by the mobile switching center 6 and are connected to those radio base stations, is registered.

It is to be noted that, in FIG. 4, a case wherein the length of one frame is 10 ms and the mobile station 16 shown in FIG. 1 is handed over from the switching source base station 11 to the switching destination base station 13 is illustrated, and a case wherein the frame 72 in a radio wave transmitted by the switching destination base station 13 in which information to be communicated by the mobile station 16 is included is late in time with respect to the frame 71 in a radio wave transmitted by the switching source base station 11 in which information to be communicated by the mobile station 16 is included is illustrated and as an example of this, a case wherein frames of the two radio waves have a difference by 2 frames in time is illustrated. It is to be noted that, actually although it cannot be considered that such a large time delay occurs between the two radio base stations 11 and 13 connected to the one mobile switching center 6, here, in order to simplify the description, such a case is described as an example.

The mobile switching center 6 allocates, by the data number management processor 96 shown in FIG. 5, such serial numbers as illustrated in FIG. 4 in units of a frame to information of radio waves transmitted from the radio base stations 11 and 13 to apply numbers simultaneously with the initiation of a hand-over process. It is to be noted that the serial numbers to be included in information of a signal to be transmitted from the mobile switching center 6 to the radio base station 11 or 13 are set repetitively, for example, for each multiple frame number of a radio channel or for each integral number of times the multiple frame number. The mobile station 16 receives the radio waves (71 and 72) arriving from the two radio base stations 11 and 13, decodes the serial numbers included in information of time slots of the radio waves and applied for each frame, and detects an arriving time difference of the two pieces of information.

The mobile station 16 having received the two radio waves from the radio base station 11 and the radio base station 13 effects switching to the new radio wave 72 simultaneously with a hand-over instruction. The variation of the numbers for each frame of the serial numbers included in the information of the signals received by the mobile station 16 before and after the switching is such as indicated by the corresponding frame 73 of the received radio waves of the mobile station upon hand-over of FIG. 4. In this instance, since the serial numbers 84 and 85 are individually received twice, the signals of 84B and 85B received for the second time must be abandoned.

In particular, for the information frames received doubly and abandoned, an instruction called a repetition code is outputted in the repetition code application period 74 to execute the abandonment. It is to be noted that the repetition code is information of a difference number between the serial numbers included in the time slot information of the two radio waves received by the mobile station 16 from the switching source base station 11 and the switching destination base station 13. Here, if the signal transmitted by the switching destination base station 13 arrives later than the signal transmitted by the switching source base station 11 in this manner, the repetition code is a negative number. The mobile station 16 transfers such a repetition code as just described to the mobile switching center 6 via the switching source base station 11 during communication.

Here, when, upon hand-over, the signal of the radio base station 11 arrives later than the signal of the radio base station 13 as seen in FIG. 4, the abandonment of the received signal based on the repetition code is executed in the mobile station 16, and information representing that the abandonment has been performed is conveyed to the mobile switching center 6 via the new switching destination base station 13. The mobile switching center 6 to which the information is conveyed switches the route from the radio base station 11 to 13, and transmission and reception of the speech channel which has been used by the radio base station 11 are stopped and the communication channel of the radio base station 13 is used for communication with the mobile station 16. The hand-over process in the case described above is completed thereby.

It is to be noted that, where the mobile switching center (MSC) in the present Embodiment 1 employs an switching center of the asynchronous transfer mode (Asynchronous Transfer Mode; hereinafter referred to as ATM type and the switching center interface of the radio base station (BS) is of the ATM type, in order to apply the serial numbers to the data described above, an order header should be added, and the purpose described above can be attained if an ATM demultiplexer (Demultiplexer) in the radio base station is set so as to decode the header.

In this instance, if the number of bits per one packet of packets (public network packets) of the ATM system transmitted by the public network (PSTN) is larger than the number of bits included in one frame of the mobile communication system in a radio section, then the radio base station divides the bits of the public network packets and transmits the divided bits in conformity with radio frames. For example, where the bit number of one public network packet is 384 bits and the bit number of a radio section per one frame is 123 bits, the packet bit number is divided into three and the thus divided bits are allocated to radio section frame bits. In this instance, the radio base station has a function of performing numbering to the divided bits.

Figure 6:
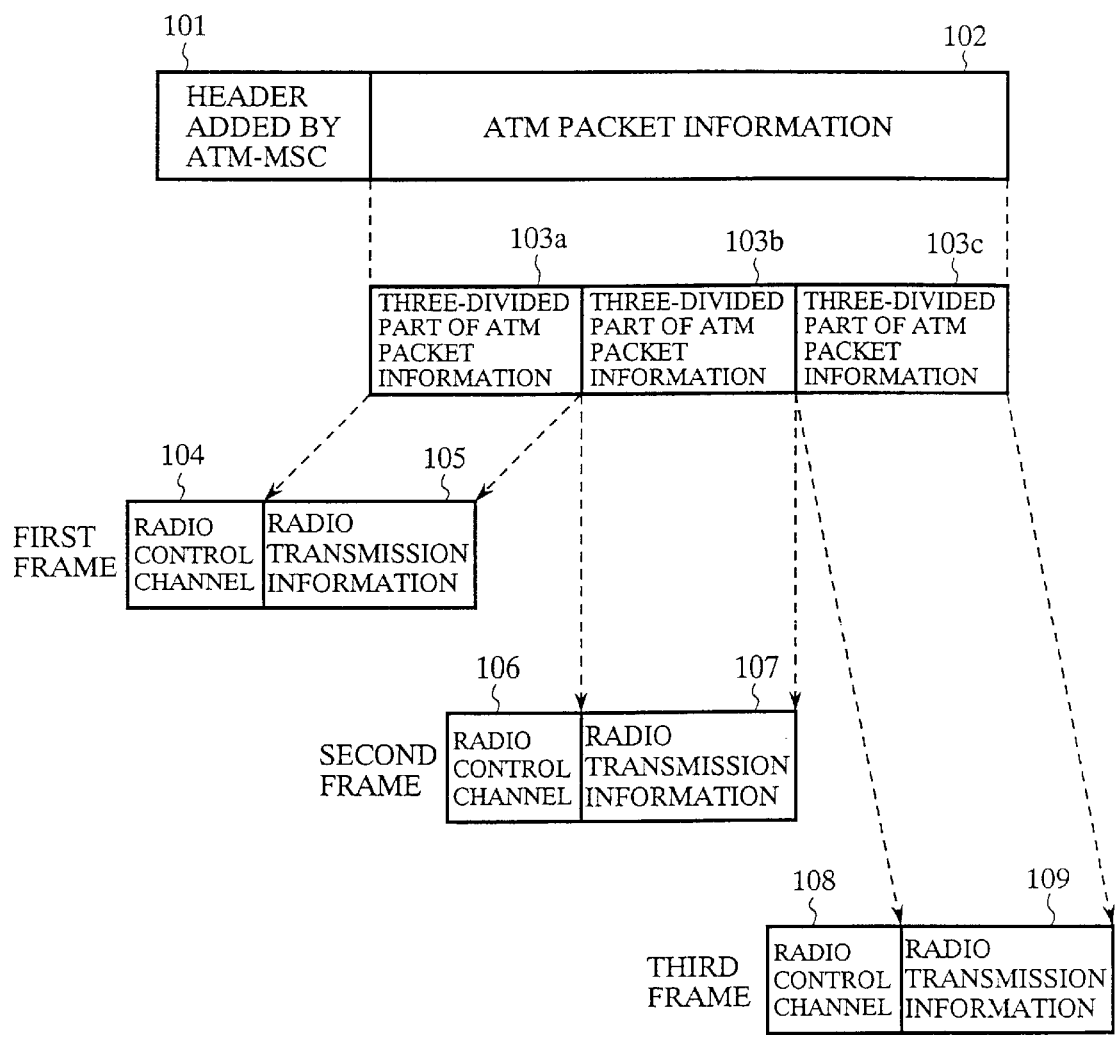
FIG. 6 is a diagrammatic view illustrating a correspondence between a structure of a public network packet and a structure of a radio channel in Embodiment 1 mentioned above.

The correspondence between the structure of a public network packet and the structure of a radio channel is illustrated in FIG. 6. Referring to FIG. 6, reference symbol 101 denotes a number header of a public network packet, 102 ATM packet information of the public network packet, 103a a first information part of the ATM packet information divided into three, 103b a second information part of the ATM packet information divided into three, and 103c a third information part of the ATM packet information divided into three. It is to be noted that the number header 101 of the public network packet is a number added by the mobile switching center 6 of the ATM type.

Further, reference symbol 104 denotes a radio control channel of the first frame of a radio channel, 105 radio transmission information of the first frame, 106 a radio control channel of the second frame, 107 radio transmission information of the second frame, 108 a radio control channel of the third frame, and 109 radio transmission information of the third frame.

The radio control channel 104 includes a control information part and a number part of a radio section, and this number part represents the first one of the numbers added by the mobile switching center 6 of the ATM type. Meanwhile, the radio transmission information 105 is a part in which the first information part 103a obtained by dividing the ATM packet information into three is to be stored. Radio information of the first frame is composed of the radio control channel 104 and the radio transmission information 105. Similarly, radio information of the second frame is composed of the radio control channel 106 including the second one of the numbers added by the mobile switching center 6 of the ATM type and the radio transmission information 107 in which the second information part 103b obtained by dividing the ATM packet information into three is stored, and radio information of the third frame is composed of the radio control channel 108 including the third one of the numbers added by the mobile switching center 6 of the ATM type and the radio transmission information 109 in which the third information part 103c obtained by dividing the ATM packet information into three is stored.

On the contrary where the number of bits included in one frame of a radio section is larger than the number of bits of one packet of public network packets (this is the case in high speed data transmission), the mobile switching center has a packet information amount variation function for transmitting ATM packet information of a public network packet as it is without dividing it to a radio base information. In such an instance, each packet in one frame is transmitted as a radio wave from a radio base station while the packet has a number applied thereto. It is to be noted that such high speed data transmission is hereinafter described in detail in connection with Embodiment 3.

As described above, according to the present Embodiment 1, there is an effect that, where a signal of a switching destination base station arrives later than a signal of a switching source base station, adjustment of information delay is performed in a mobile station by abandoning a number of signals indicated by contents of a repetition code, and a hand-over operation can be executed readily.

Embodiment 2

Subsequently, as Embodiment 2 of the present invention, a process where, contrary to the case of Embodiment 1 described above, a signal from a switching destination base station arrives earlier in time to a mobile station than a signal from a switching source base station is described.

FIG. 7 is a diagrammatic view illustrating an example of an information transmission time difference which relies upon a transmission route difference between adjacent radio base stations upon hand-over in the present Embodiment 2. Referring to FIG. 7, reference numeral 111 denotes a corresponding frame of a radio wave of a switching source base station, and 112 a corresponding frame of a radio wave of a switching destination base station, and for each of the frames, serial numbers of 81, 82, 83, 84, . . . are provided by a mobile switching center. Reference numeral 113 denotes a corresponding frame of a received radio wave of a mobile station upon hand-over, and 114 a repetition code application period in which a repetition code is applied. It is to be noted that, also in this instance, the length of one frame is indicated as 10 ms.

When the serial numbers for each frame indicated by information of the corresponding frame 112 of a radio wave of the switching destination base station 13 are received earlier than the serial numbers for each frame of information of the corresponding frame 111 of a radio wave from the switching source base station 11 by the mobile station 16 as seen in FIG. 7, the mobile station 16 measures by which number a number for each frame of the information of the corresponding frame 112 of a radio wave from the switching destination base station 13 arrives earlier. The information of a result of the measurement indicating "by which number a number arrives earlier" is conveyed to the mobile switching center 6 via the switching source base station 11. Since the number arrives earlier by only one in the example illustrated in FIG. 7, the mobile switching center 6 conveys a repetition code whose contents are "1" in order to notify the switching destination base station 13 of this information representing that "a number arrives earlier by 1". It is to be noted that, when the information to be transmitted by the switching destination base station 13 arrives earlier than the information of the switching source base station 11 in this manner, the repetition code is a positive number.

From within the serial numbers for each frame of the corresponding frame 112 of a radio wave from the switching destination base station 13, the numbers 84B, 85B and 86B indicate by the contents "1" of the repetition code that information delayed by one frame is emitted from the radio base station 13 after the point of time of hand-over.

Accordingly, the mobile station 16 receives the corresponding frame 111 of the radio wave from the switching source base station 11 till the point of time of hand-over, but receives the corresponding frame 112 of the radio wave from the switching destination base station 13 after the point of time of hand-over. Consequently, the switching destination base station 13 has a function of delaying information for an integral number of times of a frame time by a number indicated by the repetition code using a memory built therein.

At a point of time at which a radio wave emitted from the switching destination base station 13 is delayed by the number indicated by the repetition code, a serial number indicated by the switching destination base station 13 and a serial number indicated by the switching source base station 11 coincide with each other, and this coincidence is confirmed by the mobile station 16. The mobile station 16 transmits the confirmation information to the mobile switching center 6 via the new radio base station 13.

Figure 8:
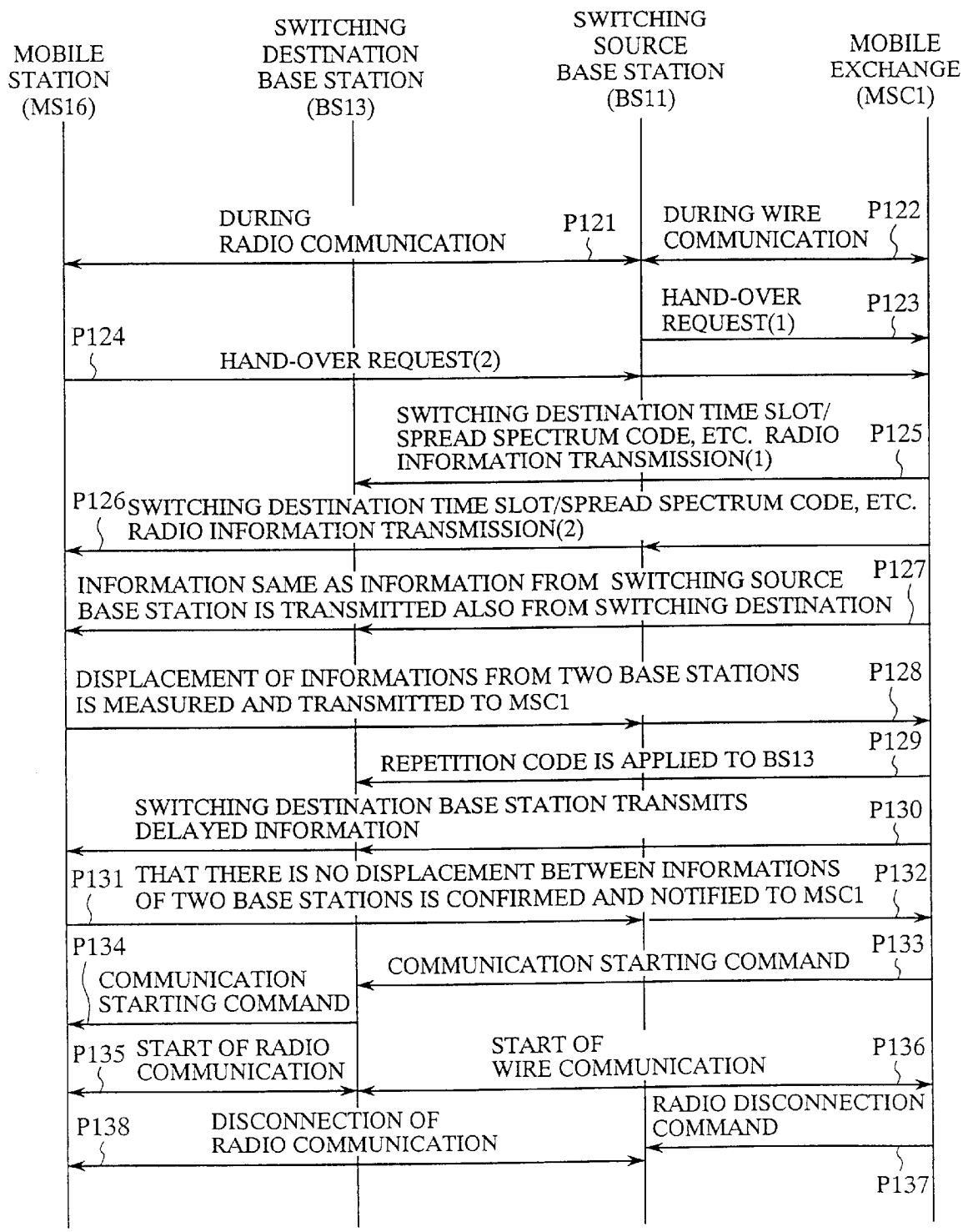
FIG. 8 is a time chart illustrating a process of hand-over in Embodiment 2 mentioned above.

FIG. 8 is a time chart illustrating a process of hand-over in the present Embodiment 2. In FIG. 8, the process P121 indicates radio connection communication between the mobile station 16 and the switching source base station 11, and the process P122 indicates wire connection communication between the radio base station 11 and the mobile switching center 6. Further, in the processes P123 and P124, a hand-over request arising from an increase in error rate or the like is transmitted from the switching source base station 11 during communication or from the mobile station 16 via the switching destination base station 11 to the mobile switching center 6.

The mobile switching center 6 having received this hand-over request transmits, to the switching destination base station 13 in the process P125 or to the mobile station 16 via the switching source base station 11 in the process P126, radio information such as a time slot or a spread spectrum code of the switching destination. At this point of time, the switching destination base station 13 begins, in the processing P127, to transmit the same signal as that of the down-link of the switching source base station 11 via the switching destination channel. Further, the mobile switching center 6 simultaneously applies serial numbers in units of a frame length to the signals to be transmitted to the two radio base stations 11 and 13.

The mobile station 16 receives the serial numbers individually from the two radio base stations 11 and 13 and measures, in the process P123, a displacement between the serial numbers transmitted by the two radio base stations 11 and 13 and transmits the displacement information to the mobile switching center 6 via the radio base station during communication (in this instance, the switching source base station 11). The number of the displacement conveyed in this process P123 is notified as a repetition code from the mobile switching center 6 to the switching destination base station 13 in the process P129. The switching destination base station 13 starts, in the process P130, transmission of a signal delayed by the number to the mobile station 16. The mobile station 16 confirms, in the processes P131 and P132, that the serial numbers of the information included in the frames of the radio waves from the two radio base stations 11 and 13, described above, exhibit coincidence, and transmits the confirmation information to the mobile switching center 6 via the switching source base station 11.

The mobile switching center 6 transmits, in the process P133, a "communication starting command" to the switching destination base station 13, and the switching destination base station 13 transfers the information to the mobile station 16 in the process P114. Then, in the process P135, radio communication between the mobile station 16 and the switching destination base station 13 is started, and in the process P136, wire communication is started between the switching destination base station 13 and the mobile switching center 6. Thereafter, in the process P137, a "radio disconnection command" is transmitted from the mobile switching center 6 to the switching source base station 11, and in the process P138, the radio communication between the switching source base station 11 and the mobile station 16 is disconnected.

As described above, according to the present Embodiment 2, there is an effect that, when a signal of a switching destination base station arrives earlier than a signal from a switching source base station, delays of the signals from the two radio base stations become equal to each other at a mobile station by delaying transmission of the switching destination base station, and a hand-over operation of the mobile station can be executed readily.

Embodiment 3

Subsequently, as Embodiment 3 of the present invention, hand-over upon high speed data transmission is described.

The aforementioned Japanese Patent Application No. Hei 9-164817 filed for patent separately defines a mobile communication system which can transmit data at a high speed. In this document, a case of a symmetric communication channel wherein both of up and down communications are high speed data transmission and another case of an asymmetric communication channel wherein only one of up and down communications is high speed data transmission while the other communication is low speed data transmission. Here, a mobile communication system which allows hand-over in a case of high speed data transmission which further includes an asymmetric communication channel is described.

It is to be noted that high speed data transmission can be realized by the TDMA system or the time divided CDMA system, and high speed data communication channels by the TDMA system are indicated by the time slots #51-T0/R0, T1/R1, T2/R2, T3 and T7A shown in FIG. 2, and further, a high speed data communication channel by the time divided CDMA system is indicated by the time slot #52-T7C. Also in the case of the high speed data communication channel by the time divided CDMA system, since the structure of data demodulated with a CDMA diffusion code or the structure of data before frequency spread with a CDMA spectrum spread code is considered to be the same as the structure of data of a high speed data communication channel by the TDMA system, in the following description, only an example of a high speed data communication channel by the TDMA system is described in detail.

Figure 9:
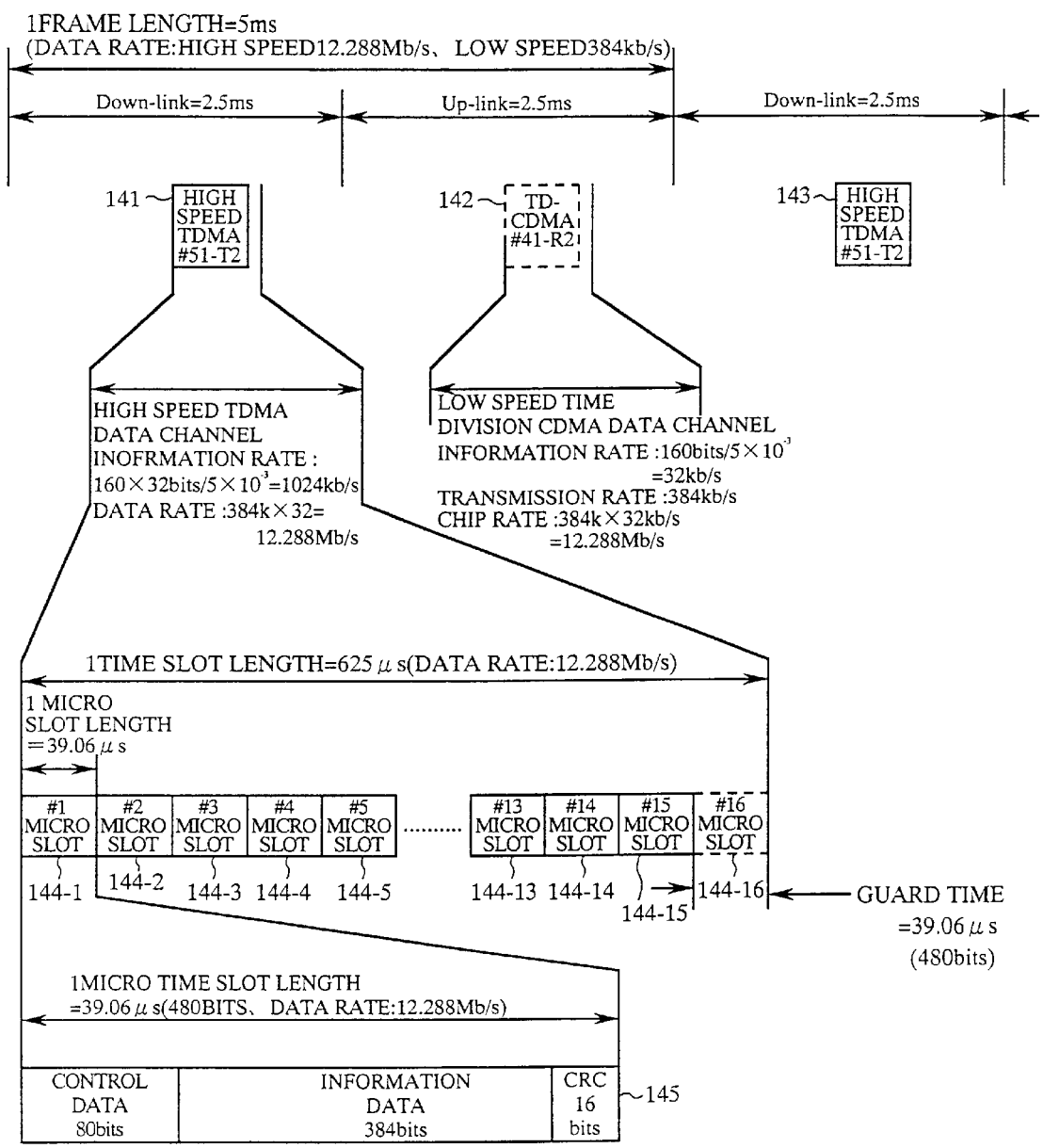
FIG. 9 is a diagrammatic view illustrating an example of a time slot structure in a frame of TDMA high speed data communication by Embodiment 3 of the present invention.

FIG. 9 is a diagrammatic view illustrating an example of a time slot structure in a frame of TDMA high speed data communication in Embodiment 3 of the present invention. Referring to FIG. 9, reference numerals 141 and 143 denote time slots corresponding to the time slot #51-T2 for TDMA high speed data communication shown in FIG. 2, and reference numeral 142 denotes a time slot corresponding to the time divided CDMA time slot #41-R2 for low speed communication. The time slot 141 has a one time slot length of 625 micro-second and is composed of 16 micro slots 144-1 to 144-16, one of which (in the case shown, the micro slot 144-16) forms a guard time of 36.06 microsecond. Meanwhile, reference numeral 145 denotes a micro slot format showing an example of an internal structure of each of the micro slots 144-1 to 144-15, and in the example shown, 384 bits of an information part (INFORMATION DATA) and 40 bits of a packet header 40 in control data (CONTROL DATA) of 80 bits have a structure coincident with the structure of a packet of the ATM type. Thus, also a case wherein a mobile switching center (MSC) may be of the ATM type and a radio base station may possibly be an ATM terminal.

While, in the example of FIG. 9, only the micro slot 144-16 is used as a guard time, when necessary, the micro slot 144-15 or also the micro slots 144-14, 144-13, . . . may be used as a guard time as in a cellular communication system or the like.

It is to be noted that, since high speed data communication is the center of the argument here, the time slot 142 for low speed data communication is not described. Further, while the time slot 141 for high seed data transmission described above is illustrated only for a down-link (Down-link), it similarly applies to an up-link (Up-link).

Figure 10:
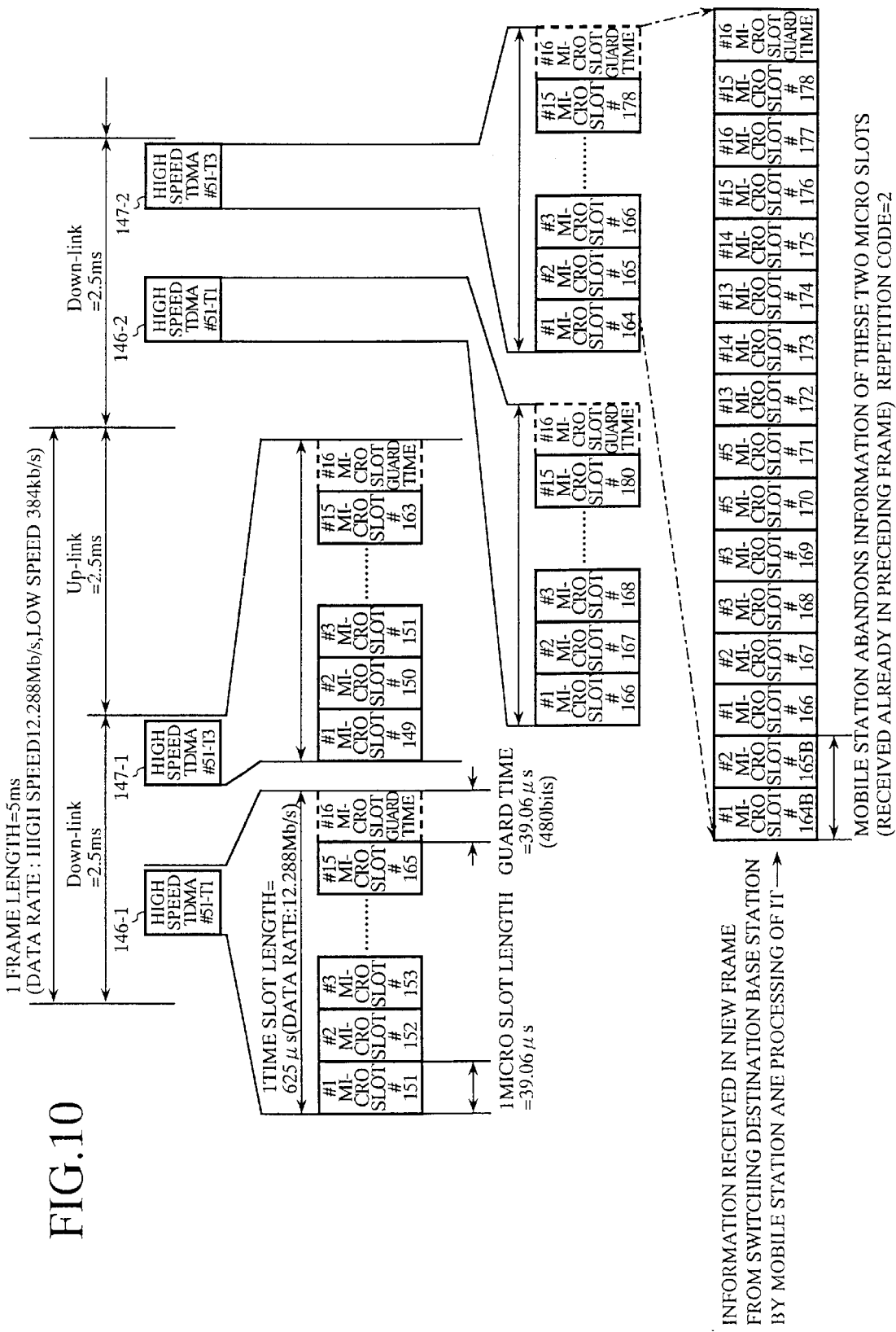
FIG. 10 is a diagrammatic view illustrating a micro slot structure upon hand-over of a high speed TDMA data channel when information of a switching destination base station arrives later than information of a switching source base station in Embodiment 3 mentioned above.

FIG. 10 is a diagrammatic view illustrating an example of a micro slot structure upon hand-over of a high speed TDMA data channel constructed based on a packet where a signal of a switching destination base station arrives later than a signal of a switching source base station. It is to be noted that, in this FIG. 10, TDMA high speed bursts 146-1 and 146-2 of a down-link transmitted by the switching source base station (for example, the radio base station 11 of FIG. 1) which is radio connected to a mobile station when hand-over is to be started and TDMA high speed bursts 147-1 and 147-2 of a down-link transmitted by the switching destination base station (for example, the radio base station 13 of FIG. 1) which is a destination of the hand-over are illustrated.

When hand-over becomes required in such a mobile communication system as described above, the distances between the mobile station and a plurality of adjacent radio base stations are measured from synchronization time displacements in frame synchronization between base stations, and discrimination of hand-over is performed based on a result of the measurement. For example, as the measurement of the synchronization time displacement of frame synchronization between base stations, a time difference except a fixed time difference between the top time position of a time divided CDMA burst signal received from the radio base station by the mobile station and the top time position of another time divided CDMA burst signal transmitted in response to an instruction of the radio base station so that the top may arrive at the radio base station at the top time position of a time slot is calculated in units of a chip rate which is used in time divided CDMA communication, and discrimination of hand-over is performed from the obtained displacement in synchronization time. It is to be noted that details of such a hand-over discrimination function as just described is omitted since it is disclosed in Japanese Patent Application No. Hei 9-191090 filed for patent separately.

A time slot of information of the burst 146-1 transmitted by the switching source base station 11 is composed of 16 micro slots, and the first micro slot number of them is #151. On the other hand, also a time slot of information of a burst 147-1 transmitted by the switching destination base station 13 is composed of 16 micro slots, and the first micro slot number of them is #149. In this manner, in FIG. 10, a case wherein the information number of the switching destination base station 13 arrives later by two from the information number of the switching source base station 11. An example wherein, in such a case as just described, although ATM packets transmitted from the mobile switching center 6 of FIG. 1 to the two radio base stations 11 and 13 are transmitted at a same time, they do not arrive simultaneously because the transmission form of them is an asynchronous form is illustrated. Actually, while the delay of one of the ATM packets by two micro slot intervals does not arise from such a simple situation as just described, since the object here is to define a countermeasure when a delay occurs, such a case as described above is presumed for the purposes of illustration.

A mobile station (for example, the mobile station 16 of FIG. 1) which tries to start hand-over successively receives, in the same frame, the burst 146-1 transmitted by the switching source base station 11 and a burst 147-1 transmitted by the switching destination base station 13. Then, the mobile station 16 recognizes that the numbers of the top micro slots of the bursts are #151 and #149, produces a repetition code whose contents are "2" which represents that the delay amount of the information is 2 micro slots, and transmits the repetition code to the mobile switching center 6 via the switching source base station 11.

The mobile switching center 6 having received the repetition code recognizes from the contents of the repetition code that the information number of the switching destination base station 13 is later by 2 than the information number of the switching source base station 11, and sends a repetition code, whose contents are "2", to the mobile station 16 via the switching destination base station 13 to instruct the mobile station 16 to abandon information of the two top micro slots of the burst 147-2 transmitted from the switching destination base station 13 and received after switching by hand-over. The mobile station 16 having received the repetition code abandons, since the contents of it are "2", information of micro slots up to the second micro slot from the top of the burst 147-2 transmitted by the switching destination base station 13. While the micro slot numbers of the information received by the mobile station 16 are those of 16 micro slots indicated at the lowermost stage in FIG. 10 whose micro slot number ranges from #164B to #178, since the first two micro slots whose micro slot numbers are #164B and #165B are abandoned, the micro slots of the remaining micro slot numbers of #166 to #178 are utilized as effective information in the mobile station 16.

As described above, according to the present Embodiment 3, there is an effect that, when a signal transmitted by a hand-over destination (switching destination base station) upon high speed data transmission arrives later than a signal transmitted by a hand-over source (switching source base station), since a mobile station abandons a number of time slots indicated by contents of a repetition code, discontinuity of information which arises upon hand-over of high speed data transmission can be eliminated.

Embodiment 4

Subsequently, as Embodiment 4 of the present invention, a process when, contrary to the case of Embodiment 3 described above, a signal from a switching destination base station arrives earlier in time at a mobile station than a signal from a switching source base station is described.

Figure 11:
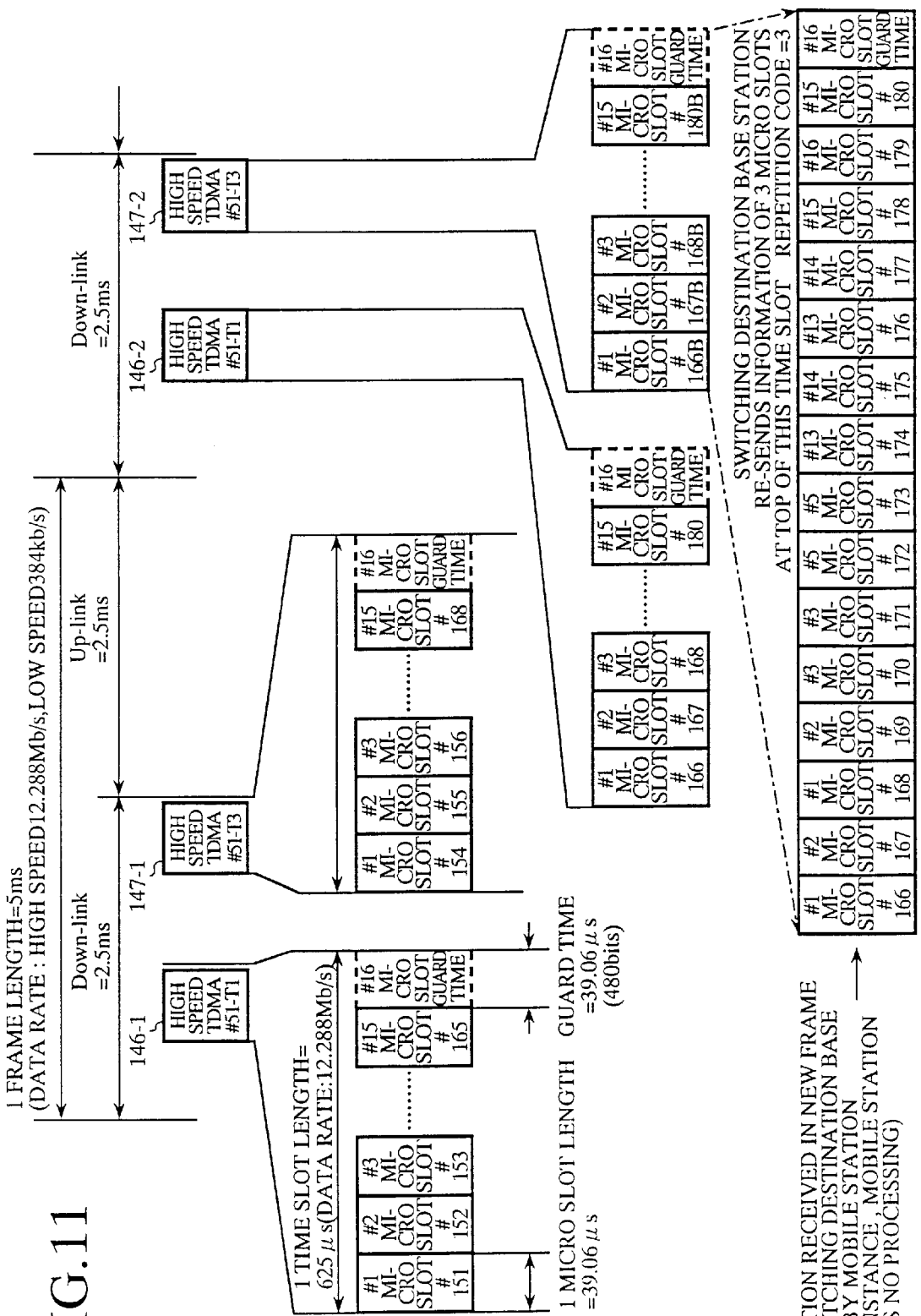
FIG. 11 is a diagrammatic view illustrating an example of a micro slot structure upon hand-over by Embodiment 4 of the present invention.

FIG. 11 is a diagrammatic view illustrating an example of a micro slot structure upon hand-over in such Embodiment of the present invention as just mentioned. It is to be noted that, in this FIG. 11, high speed TDMA bursts 146-1 and 146-2 of a down-link transmitted by the switching source base station 11 which is radio connected to the mobile station when hand-over is to be started and TDMA high speed bursts 147-1 and 147-2 of a down-link transmitted by the switching destination base station 13 of a hand-over destination are illustrated.

The first micro slot number from 16 micro slots which form a time slot of information of the burst 146-1 transmitted by the switching source base station 11 is #151, and the first micro slot number of 16 micro slots which form a time slot of information of the burst 147-1 transmitted by the switching destination base station 13. In this manner, a case wherein the information number of the radio base station 11 arrives later by 3 than the information number of the switching destination base station 13 is illustrated in FIG. 11. An example wherein, in such a case as just described, although ATM packets transmitted from the mobile switching center 6 of FIG. 1 to the two radio base stations 11 and 13 are transmitted at a same time, they do not arrive simultaneously because their transmission form is an asynchronous form is illustrated.

The mobile station 16 which tries to start hand-over successively receives, in the same frame, the burst 146-1 transmitted by the switching source base station 11 and the burst 147-1 transmitted by the switching destination base station 13. Then, the mobile station 16 recognizes that the numbers of the top micro slots of the bursts are #151 and #154, produces a repetition code whose contents are "3" which represents that the delay amount of the information is 3 micro slots, and transmits the repetition code to the mobile switching center 6 via the switching source base station 11.

The mobile switching center 6 having received the repetition code recognizes from the contents of the repetition code that the information number of the switching destination base station 13 is later by 3 than the information number of the radio base station 11, and sends a repetition code, whose contents are "3", to the switching destination base station 13 to instruct the switching destination base station 13 to repetitively transmit, as information of the three top micro slots of the burst 147-2 to be transmitted by the switching destination base station 13, information of the three last micro slots of the preceding frame. The switching destination base station 13 having received the repetition code stores, since the contents of it are "3", the last three micro slots from within the information of the micro slots which have been transmitted already into a memory built therein, and successively transmits, simultaneously with hand-over, the information of the micro slots of the burst 147-2 beginning with the information of the micro slots for the three micro slots stored in the memory.

On the other hand, the mobile station 16 having received the repetition code via the switching destination base station 13 receives, in accordance with the instruction from the same, information of the micro slots of the burst 147-2 transmitted by the switching destination base station 13 without performing any special processing. The micro slot numbers of the information received by the mobile station 16 are those of 16 micro slots indicated in the lowermost stage of FIG. 11 whose micro slot numbers range from #166 to #180, and while the first three micro slots whose micro slot numbers range from #166 to #168 are the information transmitted by the preceding frame by the switching destination base station 13 and transmitted again, the mobile station 16 utilizes all of those received micro slots whose micro slot numbers range from #166 to #180 as effective information.

As described above, according to the present Embodiment 4, there is an effect that, when a signal transmitted by a hand-over destination (switching destination base station) upon high speed data transmission arrives earlier than a signal transmitted by a hand-over source (switching source base station), since the switching destination base station re-sends a number of the last time slots of the preceding frame indicated by contents of a repetition code, discontinuity of information which arises upon hand-over in high speed data transmission can be eliminated.

Embodiment 5

It is to be noted that, while the embodiments described above indicate a down-link by which a radio wave is transmitted from a radio base station to a mobile station of a destination of hand-over, here, as Embodiment 5 of the present invention, operation of a system upon hand-over of an up-link by which a radio wave is transmitted from a mobile station to a radio base station is described.

An important characteristic in the description of a process upon hand-over of an up-link in the present mobile communication system is that the system is a synchronous system in which synchronism of frames of radio signals transmitted by a plurality of radio base stations is established, and synchronism establishment of the present system is disclosed in detail in Japanese Patent Application No. Hei 9-191090 filed for patent separately. According to the mobile combination system disclosed in this Japanese Patent Application No. Hei 9-191090, as described also hereinabove, from a time difference except a fixed time difference between the top time position of a time divided CDMA burst signal received from a radio base station by a mobile station and the top time position of a time divided CDMA burst signal transmitted to the radio base station in accordance with an instruction of the radio base station so that the top may arrive at the top time position of a time slot, the distance between the mobile station and each of a plurality of adjacent radio base stations is measured to establish frame synchronism between the radio base stations.

It is to be noted that, while this Japanese Patent Application No. Hei 9-191090 does not mention high speed data communication, a synchronization system between base stations similar to that of this Japanese Patent Application No. Hei 9-191090 can be applied also to a system which includes high speed data communication only if frames of the TDMA system or the time divided CDMA system are same and also frames of high speed data communication by the TDMA system or the time divided CDMA system are same as the frames described above. Further, if the symbol rate of high speed TDMA data communication is equal to the chip rate of a low speed or high speed data communication channel by the time divided CDMA or is in a relationship in which it has a value of the chip rate multiplied or divided by 2 to the nth power, then high speed data communication and time divided CDMA whose frame synchronizations are same can be identified with each other in regard to establishment of synchronism.

Based on such a systematic characteristic as described above, a hand-over operation of an up-link of the mobile communication system of the present Embodiment 5 is described.

Here, a case wherein the necessity for hand-over arises as the mobile station 16 moves toward the radio base station 13 in a condition wherein the radio base station 11 and the mobile station 16 shown in FIG. 1 are radio connected to each other is examined.

A radio wave of the up-link from the mobile station 16 is received simultaneously by the two radio base stations 11 and 13, and besides, since the two radio base stations 11 and 13 are frame synchronized with each other, it is considered that the arrival time difference between the received signals at the two radio base stations 11 and 13 is an error within a guard time. Accordingly, it is recognized that the problem involved in channel switching upon hand-over of the up-link is not a problem of arrival of radio waves between the mobile station 13 and the radio base stations 11 and 13, but another problem of which one of them is received first by the mobile switching center 6 in an asymmetrical transmission mode between the two radio base stations 11 and 13 and the mobile switching center 6 or whether the order of packets transmitted from the mobile switching center 6 to the public network 1 may be reversed because information of the preceding frame is delayed. In the present Embodiment 5, such a problem as just described is solved in the following manner.

FIG. 12 is a diagrammatic view illustrating a structure of an ATM packet to be transmitted to a mobile switching center by a radio base station and radio channel information. Referring to FIG. 12, reference numeral 191 denotes time slot information of the up-link transmitted to the radio base station 11 or 13 by the mobile station 16 shown in FIG. 1, 192 control data (Control Data) of the time slot information 191, and 193 information data (Information Data) transmitted by the time slot information 191. Reference numeral 194 denotes a packet form modified from the time slot information 191, 195 a header of the packet form 194 added by a radio base station of the ATM type, and 196 information data (Information Data) transmitted. Reference numeral 197 denotes a packet signal sent from a mobile switching center to a data base, 198 a header added by a mobile switching center of the ATM type, and 199 ATM packet information transmitted.

The control data 192 of the time slot information 191 transmits control information necessary for line connection between the mobile station 16 and the radio base station 11 or 13 and so forth, and the information data 193 is used to transmit information from the mobile station 16 to the data base 2 via the radio base station 11 or 13, mobile switching center 6 and public network 1. This time slot information 191 is modified into the packet form 194 to be transmitted to the mobile switching center 6 by the radio base station 11 or 13. This modification from the time slot information 191 to the packet form 194 removes information peculiar to radio from the control data 192 of the time slot information 191 and adds information for notification to the mobile switching center 6.

In order to settle the order of the information, multi-frame numbers on a radio channel received by the radio base station 11 or 13 are added as serial numbers relating to the multi-frames of the radio channel to the header 195 of the packet form 194 to be transmitted from the radio base station 11 or 13 to the mobile switching center 6. It is to be noted that the serial numbers relating to the multi-frames of the radio channel may be set so as to be repeated for each integral number of times the multi-frame.

The mobile switching center 6 checks the multi-frame numbers in the header 195 of the packet form 194 received from the two radio base stations 11 and 13 during hand-over to discriminate the orders of the information and sends a packet signal 197 modified from the packet form 194 based on the order to the data base 2 via the public network 1. Thereupon, the header 198 of the packet signal 197 transmitted by the mobile switching center 6 is a packet header defined by the public network 1.

It is to be noted that, since the header 195 of the packet form 194 transmitted from the radio base stations 11 and 13 to the mobile switching center 6 is used only by a system closed in the mobile communication system, it may have a structure different from that of the header 198 of the packet signal 197 which is used by the public network 1. In particular, in the example described above, multi-frame numbers of information are added. Further, it is a matter of course that, upon variation of the packet form by the radio base stations 11 and 13 and the mobile switching center 6, contents of the portions of the information data 193 and 196 and the ATM packet information 199 need not be varied.

As described above, according to the present Embodiment 5, there is an effect that, by adding multi-frame numbers on a radio channel to a packet header to be transmitted from a radio base station to a mobile switching center, the order of signals transmitted by the mobile station can be identified by the mobile switching center, and it can be eliminated upon hand-over that the order of information transmitted from the mobile switching center to a public network is mistaken.

Embodiment 6

Subsequently, as Embodiment 6 of the present invention, a structure of a mobile station for a TDMA/time divided CDMA/high speed TDMA/high speed time divided CDMA communication system is described.

Here, FIG. 13 is a block diagram showing a construction of such a mobile station as just described according to Embodiment 6 of the present invention. Referring to FIG. 13, reference numeral 201 denotes an antenna, 202 a transmission/reception distribution section which performs distribution of a signal received by the antenna 201 and a signal to be transmitted from the antenna 201, 203 an RF (radio frequency; Radio Frequency) reception section which performs amplification of a signal received by the antenna 201, and 204 an RF transmission section which performs amplification of a signal to be transmitted from the antenna 201. It is to be noted that the RF reception section 203 has a built-in switch for selecting a system for transmission, that is, a communication system by which a necessary amount of information can be transmitted, in synchronism with a time slot, and switches an output destination in response to a communication system.

Reference numeral 205 denotes a high speed/low speed equalization demodulator which includes high speed and low speed equalizers for removing delay propagation distortions by a propagation route and demodulates a signal selected and outputted by the RF transmission section 204 when a low speed TDMA or high speed TDMA channel is to be utilized, and 206 a correlation reception/reverse diffusion coding calculating section which multiplies, when a time divided CDMA channel diffusion coded using a diffusion coding signal is utilized, a signal selected and outputted by the RF reception section 203 by a diffusion code allocated to the self station (reverse coding calculation), extracts the original signal which is not diffusion coded (correlation reception) and outputs the original signal to the high speed/low speed equalization demodulator 205. Reference numeral 207 denotes a channel reception/TDMA separation section hereinafter referred to CH reception/TDMA separation section) which extracts a necessary signal from a format of a signal demodulated by the high speed/low speed equalization demodulator 205 (demultiplexing) and supplies the extracted signal to a processing section for the signal.

Reference numeral 208 denotes an error correction/ speech decoding section which corrects errors of information demultiplexed by the CH reception/TDMA separation section 207, decodes data and a speech signal from the information and supplies them to a man-machine interface not shown. Reference numeral 209 denotes an error correction/speech coding section which codes data or a speech signal supplied thereto from the man-machine interface and adds a code for error correction to the coded data or speech signal. Reference numeral 210 denotes a control information processor which performs decoding of control data demultiplexed by the CH reception/TDMA separation section 207 and gives instructions of various functions based on the decoded control data to the mobile station, and further produces control data responding to the mobile station.

Reference numeral 211 denotes a channel transmission/TDMA multiplexing section (hereinafter referred to as CH transmission/TDMA multiplexing section) which multiplexes data or a speech signal error correction coded by the error correction/speech coding section 209 and control data from the control information processor 210, incorporates the multiplexed data in a necessary time slot in a frame format and outputs resulting data. It is to be noted that the CH transmission/TDMA multiplexing section 211 has a built-in switch for selecting a system for transmission, that is, a communication system by which a necessary amount of information can be transmitted, in synchronism with a time slot, and switches the outputting destination in accordance with the communication system. Reference numeral 212 denotes a modulator which modulates, when a low speed TDMA or high speed TDMA channel is utilized, information outputted from the CH transmission/TDMA multiplexing section 211 and outputs the modulated information to the RF transmission section 204, and 213 denotes a correlation coding/diffusion coding calculation section which diffuses, when a time divided CDMA channel is utilized, information outputted from the CH transmission/TDMA multiplexing section 211 on the frequency base using a diffusion code allocated to the self station to code the information and inputs the coded information to the modulator 212.

Reference numeral 214 denotes a burst control/in-frame time setting and time measurement section which performs control of the emission time of a radio wave burst to be emitted from the self station, in-frame time setting for setting in which time slot a radio wave is to be emitted, time measurement for transmission timing setting of a radio wave burst and so forth. Reference numeral 215 denotes a diffusion code generator-chip rate generator which generates a chip rate to be used for time measurement by the burst control/in-frame time setting and time measurement section 214 and a diffusion code allocated to the self station.

Reference numeral 216 denotes a data buffer memory as storage means which stores high speed data information as information included in a time slot demultiplexed by the CH reception/TDMA separation section 207 or information of a micro slot in the time slot. Reference numeral 217 denotes a frame synchronization control processor as control means which instructs the data buffer memory 216 to abandon stored information by a number corresponding to contents of a repetition code transferred thereto from the control information processor 210 which has received control data demultiplexed by the CH reception/TDMA separation section 207.

Subsequently, abandonment of doubly received information by the mobile station constructed in such a manner as described above is described.

The mobile station shown in FIG. 13 can realize hand-over on a mobile communication system having an asymmetric communication channel. For example, such a case wherein a high speed data channel by the TDMA system is set for large capacity transmission in a down-link and a signal from a switching destination base station arrives later than a signal from a switching source base station as shown in FIG. 10 is considered. In such a case, a radio frequency signal of a TDMA high speed data channel inputted from the antenna 201 is inputted to the RF reception section 203 via the transmission/reception distribution section 202 and then converted into a digital signal by the high speed/low speed equalization demodulator 205 which includes the equalizers, whereafter it is demultiplexed into control information and high speed data information by the CH reception/TDMA separation section 207. The demultiplexed control information is delivered to the control information processor 210 while the high speed data information is delivered to the data buffer memory 216.

When such hand-over as seen in FIG. 10 is to be started, since the control information delivered to the control information processor 210 conveys information of by which numbered frame in a multi-frame hand-over switching is to be performed and a repetition code, the control information processor 210 transfers the information to the frame synchronization control processor 217. The frame synchronization control processor 217 instructs, at the number of the switching frame, the data buffer memory 216 to abandon information of a number of the top micro slots of the frame equal to the number designated by the repetition code. The remaining information is supplied from the data buffer memory 216 to the error correction/speech decoding section 208, from which error corrected information is outputted to the man-machine interface.

Further, as described in "hand-over in an up-link" of Embodiment 5 described above, in the present mobile communication system, hand-over processing in an up-link does not particularly matter between a mobile station and a radio base station, and the mobile station does not require any special processing. Accordingly, a case wherein the up-link handles low speed data is described here with reference to FIG. 13.

Low speed data inputted from a data generation source (the man-machine interface) is subject to processing of error correction and so forth of the error correction/speech coding section 209 and is multiplexed with control information from the control information processor 210 by the CH transmission/TDMA multiplexing section 211. Where a time divided CDMA channel is utilized for the low speed data, the multiplexed signal is CDMA coded by the correlation coding/diffusion coding calculation section 213 and transmitted to a radio base station via the modulator 212, RF transmission section 294, transmission/reception distribution section 202 and antenna 201.

It is to be noted that, since this processing of the up-link is described in Japanese Patent Application No. Hei 90164817 filed for patent already by the present applicant and cited in the above described Embodiment 3 in which it is described in outline, the description of a case wherein a low speed CDMA data channel is set for a down-link or an up-link handles high speed data is omitted.

As described above, according to the present Embodiment 6, there is an advantage that, when a mobile station used in the present mobile communication system effects hand-over, it is only required that the data buffer memory 216 having a function of deleting data of a down-link and the frame synchronization control processor 217 for controlling the data buffer memory 216 be set. As regards an up-link, the mobile station need not particularly be conscious of hand-over in regard to a delay of data except switching to radio parameters (a frequency, a time slot and so forth) of a switching destination base station.

Embodiment 7

Embodiment 7 of the present invention, a structure of a radio base station for a TDMA/time divided CDMA/high speed TDMA/high speed time divided CDMA communication system is described below.

Figure 14:
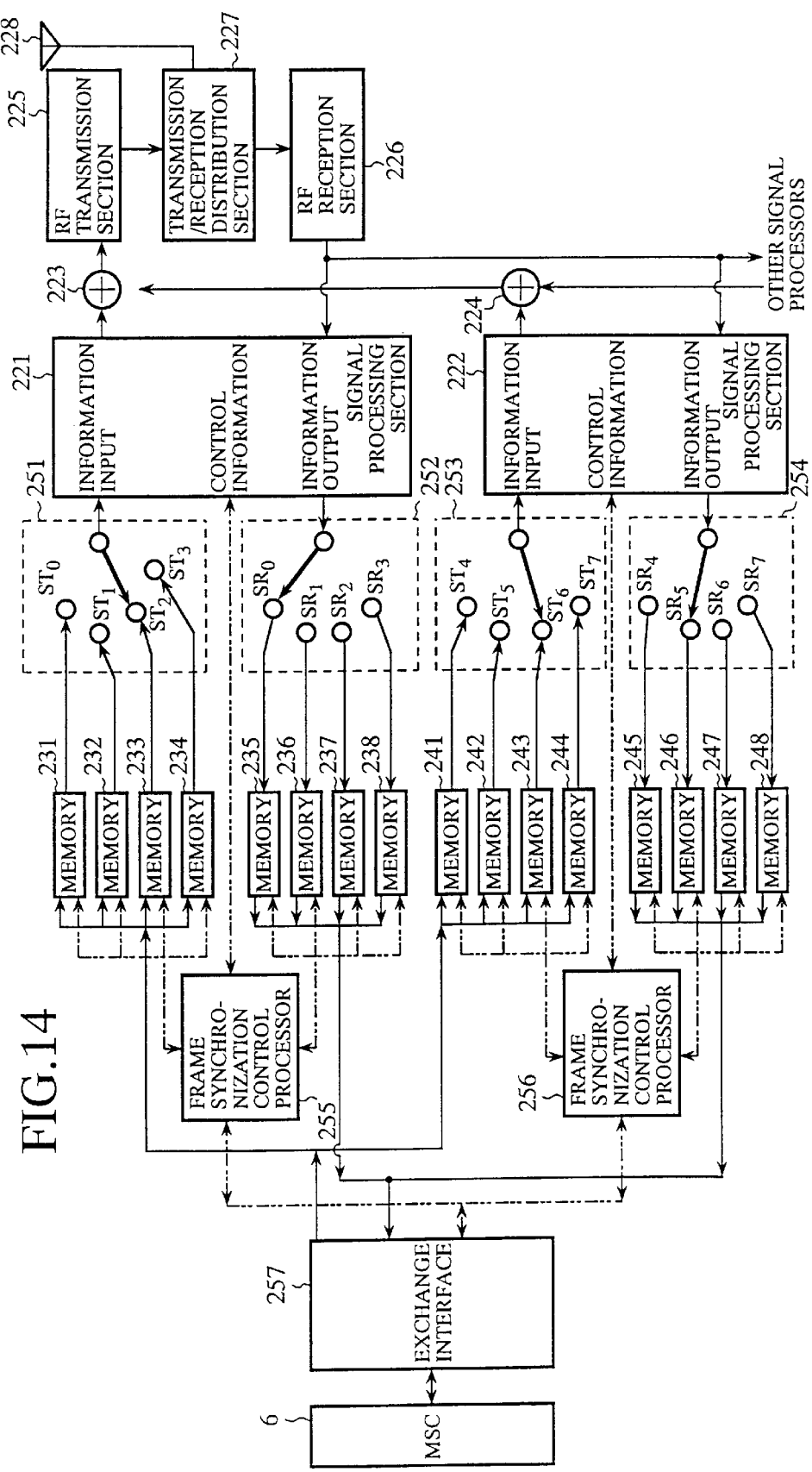
FIG. 14 is a block diagram showing a construction of a radio base station by Embodiment 7 of the present invention.

FIG. 14 is a block diagram showing a construction of such a radio base station as mentioned above according to Embodiment 7 of the present invention. Referring to FIG. 14, reference numerals 221 and 222 denote each a signal processing section having functions equivalent to the mobile station shown in FIG. 13 except the antenna 201, transmission/reception distribution section 202, RF reception section 203, RF transmission section 204, data buffer memory 216 and frame synchronization control processor 217. Reference numerals 223 and 224 denote adders which perform addition of signals outputted from a plurality of signal processing sections including the signal processing sections 221 and 222, and reference numeral 225 denotes an RF transmission section, 226 an RF reception section, 227 a transmission/reception distribution section, and 228 an antenna.

Further, reference numerals 231 to 238 and 241 to 248 denote each a channel allocation memory as storage means for storing information included in a time slot or information of micro slots in a time slot, and the memories 231, 235, 241 and 245 are used for time divided CDMA channel conversion, the memories 232, 236, 242 and 246 for low speed TDMA data channel conversion, the memories 233, 237, 243 and 247 for high speed TDMA/high speed time divided CDMA data channel conversion, and the memories 234, 238, 244 and 248 for TDMA/time divided CDMA control channel conversion. It is to be noted that the memories 231 to 234 and 241 to 244 and the memories 235 to 238 and 245 to 248 perform conversions in the opposite directions to each other.

Reference numeral 251 denotes a switch for selecting a system for transmission to be used to select one of the memories 231 to 234 and connect it to an information input of the signal processing section 221, that is, a communication system by which a necessary amount of information can be transmitted, in synchronism with a time slot, and 252 a switch for communication system selection for connecting an information input of the signal processing section 221 to one selected memory 235 to 238. Similarly, reference numeral 253 denotes a switch for communication system selection for connecting one of the memories 241 to 244 and connecting it to an information input of the signal processing section 222, and 254 denotes a switch for communication system selection for connecting an information input of the signal processing section 222 to one selected memory 245 to 248.

Reference numeral 255 denotes a frame synchronization processor as control means which controls the memories 231 to 234 to store information transmitted already by a number designated by contents of a repetition code received from the mobile switching center 6 and perform re-sending of the stored information upon starting of hand-over and controls the memories 235 to 238 to add a new header including a serial number to received information. Reference numeral 256 denotes a frame synchronization processor as control means which controls the memories 241 to 244 to store information transmitted already by a number designated by contents of a repetition code received from the mobile switching center 6 and perform re-sending of the stored information upon starting of hand-over and controls the memories 245 to a new header including a serial number to received information. Meanwhile, reference numeral 257 denotes an switching center interface which serves as an interface between the radio base station and the mobile switching center 6.

Figure 15:
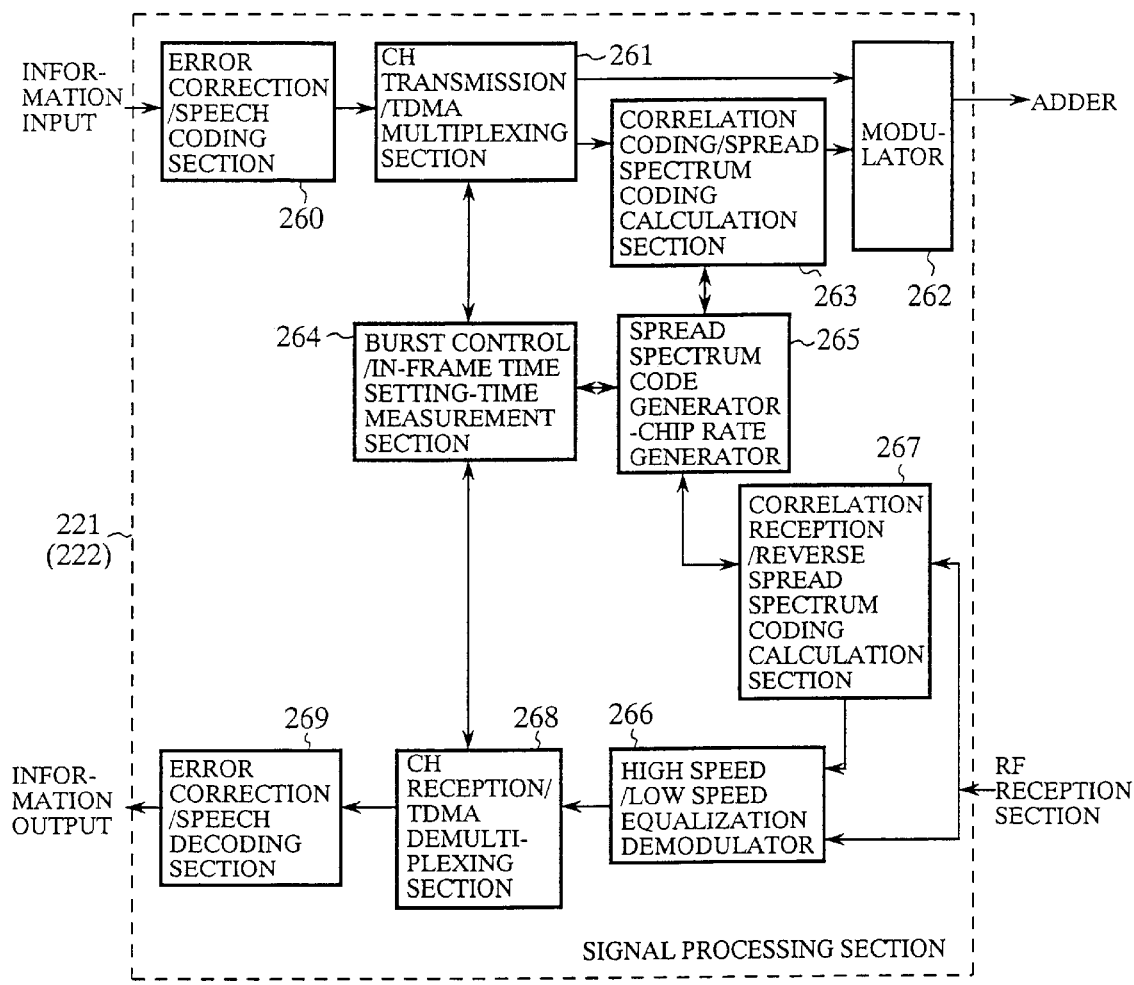
FIG. 15 is a block diagram showing an internal construction of a signal processing section in Embodiment 7 mentioned above.

Further, FIG. 15 is a block diagram showing an internal construction of the signal processing sections 221 and 222. Referring to FIG. 15, reference numeral 260 denotes an error correction/speech coding section, 261 a CH transmission/TDMA multiplexing section, 262 a modulator, 263 a correlation coding/diffusion coding calculation section, 264 a burst control/in-frame time setting-time measurement section, 265 a diffusion code generator-chip rate generator, 266 a high speed/low speed equalization demodulator, 267 a correlation reception/reverse diffusion coding calculation section, 268 a CH reception/TDMA demultiplexing section, and 269 an error correction/speech decoding section, and they are equivalent to the corresponding members shown in FIG. 13.

Subsequently, operation when the radio base station constructed in such a manner as described above is used as a switching destination base station upon hand-over is described.

It is to be noted that description of operations by the units 260 to 269 in the signal processing sections 221 and 222 whose internal construction is shown in FIG. 15 is omitted here since the operations are similar to those by the units 205 to 209 and 211 to 215 of the mobile station shown in FIG. 13.

Here, in FIG. 7, an example of an information arrival time difference which relies upon a transmission route difference when a signal transmitted by a switching destination base station arrives earlier than a signal of a switching source base station. In such an instance, the frame synchronization control processor 255 of FIG. 14 controls the memories 231 to 234 to transmit information of a time slot, to which a serial number 84 is applied upon hand-over as indicated by a corresponding frame 112 of a transmission radio wave of the switching destination base station illustrated in FIG. 7, to a mobile station again.

In particular, the frame synchronization control processor 255 controls, based on contents "1" of a repetition code received from the mobile switching center 6 via the switching center interface 257, the memory 231 for time divided CDMA channel conversion or the memory 232 for low speed TDMA data channel conversion to store information for one time slot and output the information to the information input of the signal processing section 221 after hand-over. The signal processing section 221 processes the received information by an operation equivalent to that of the mobile station shown in FIG. 13 and successively transmits resulting information as a radio wave via the adder 223, RF transmission section 225, transmission/reception distribution section 227 and antenna 238.

On the other hand, while the high speed TDMA data transmission illustrated in FIG. 11 indicates a case wherein a signal of the switching destination base station arrives earlier by 3 micro slots than a signal of the switching source base station, in this instance, the frame synchronization control processor 255 controls, based on contents "3" of a repetition code received from the mobile switching center 6 via the switching center interface 257, the memory 233 for high speed TDMA data channel conversion to store information for 3 micro slots and output the information to the information input of the signal processing section 221 after hand-over so that it is successively transmitted as a radio wave from the signal processing section 221 via the adder 223, RF transmission section 225, transmission/reception distribution section 227 and antenna 228.

Subsequently, operation of the radio base station as a switching destination base station when a signal from a mobile station is received in an up-link upon hand-over is described.

According to the hand-over processing in an up-link described hereinabove in connection with Embodiment 5, in an up-link of a switching destination base station, it is necessary to add, to a header of packet type information to be transmitted to the mobile switching center 6, a new header which includes a frame number in a multi-frame as information. This operation of adding a new header is performed by the memories 235 to 238 or 245 to 248 under the control of the frame synchronization control processor 255 or 256 shown in FIG. 14.

Here, in an up-link of the present mobile communication system, since the problem of a data delay does not occur as described above, deletion or delaying of information is not performed by any of the memories 235 to 238 and 245 to 248 described above. In other words, by the memories 235 to 238 and 245 to 248, only conversion of an information rate on a radio wave and conversion of an information rate on a wire link are performed.

As described above, according to the present Embodiment 7, there is an advantage that, also when a signal of a switching destination base station upon hand-over arrives earlier than a signal of a switching source radio base station, information stored in the memories 231 to 234 or 241 to 244 is delayed and transmitted by control of the frame synchronization control processor 225 or 226, it can be avoided that a mobile station receives continuous information while the information drops partially upon hand-over.

Embodiment 8

It is to be noted that, while, in the embodiments described above, a case wherein mobile switching centers (MSC) are connected to each other via a public network (PSTN) is described, mobile switching centers may be connected directly to each other by an additional communication line.

Figure 16:
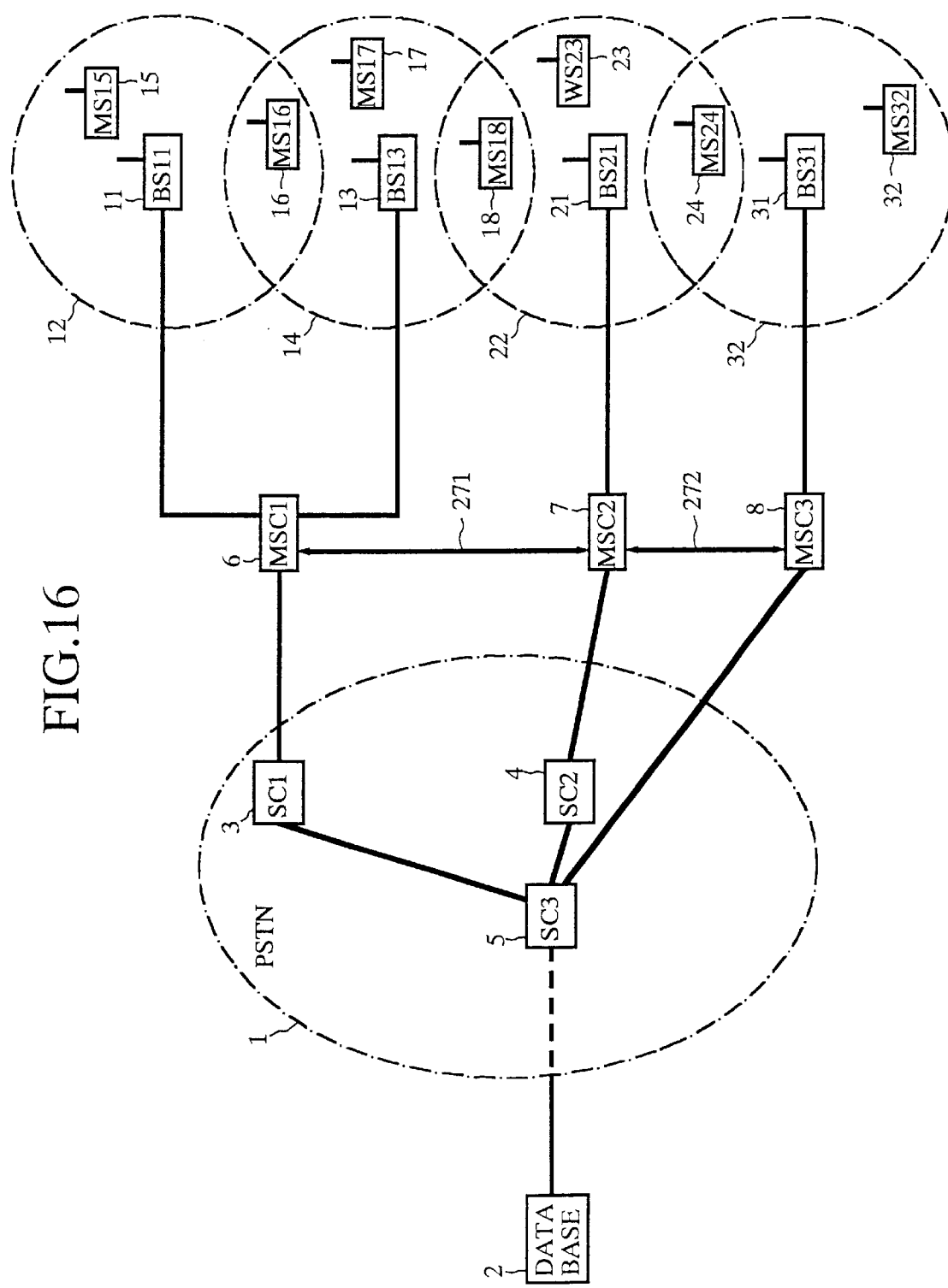
FIG. 16 is a system diagram showing an entire construction diagram of a mobile communication system according to Embodiment 8 of the present invention.

FIG. 16 is a system diagram showing an entire system construction diagram of a mobile communication system of Embodiment 8 of the present invention having such a construction as just described, and description of corresponding elements is omitted with same reference symbols as those of FIG. 1 applied thereto. Referring to FIG. 16, reference numeral 271 denotes an additional communication line which is provided between and directly connects the mobile switching center 6 and the mobile switching center 7 to each other, and 272 another additional communication line which is provided between and directly connects the mobile switching center 7 and the mobile switching center 8 to each other. Those additional communication lines 271 and 272 are used when hand-over s performed between radio base stations which belong to different mobile switching centers such as, for example, from the radio base station 13 which belongs to the mobile switching center 6 to the radio base station 21 which belongs to the mobile switching center 7.

When it is supposed that, in FIG. 16, the mobile station 18 which is communicating with the switching source base station 13 approaches the switching destination base station 21, the additional communication line 271 which directly connects the mobile switching center (hereinafter referred to as switching source mobile switching center) 6 to which the switching source base station 13 is connected and the mobile switching center (hereinafter referred to as switching destination mobile switching center) 7 to which the switching destination base station 21 is connected to each other is particularly used in the following manner.

The switching source mobile switching center 6 discriminates that, as a result of the approach of the mobile station 18 to the switching destination base station 21, it becomes necessary to hand over the other party of communication of the mobile station 18 from the switching source base station 13 to the switching destination base station 21. To the mobile switching center 6, the other party on the public network side in this communication is the data base 2, and it is assumed that information of the data base 2 is connected by the switching center 3 and the switching center 5 which belong to the public network 1. Originally, it may be ordinary to transfer the relaying function between the mobile station 18 and the data base 2 from the switching source mobile switching center 6 to the switching destination mobile switching center 7 to which the radio base station 21 of the destination of hand-over is connected simultaneously with hand-over. In particular, in an ordinary case, the connection prior to hand-over starts from the data base 2, passes the switching center 5 which belongs to the public network 1, switching center 3, switching source mobile switching center 6 and switching source base station 13, and comes to the mobile station 18. On the other hand, the connection after hand-over may start from the data base 2, pass the switching center 5 which belongs to the public network, switching center 4, switching destination mobile switching center 7 and switching destination base station 21 and come to the mobile station 18.

However, in the present Embodiment 8, when hand-over is to occur, transition to the final form described above in which the connection starts from the data base 2, passes the switching center 5, which belongs to the public network 1, and then passes the switching center 4, switching destination mobile switching center 7 and switching destination base station 21 and comes to the mobile station 18 does not occur immediately. Firstly transition to an intermediate form occurs. In this form, the connection starts from the data base 2, passes the switching center 5, which belongs to the public network 1, then passes the switching center 3 and mobile switching center 6 as well as the switching destination mobile switching center 7 and switching destination base station 21 and comes to the mobile station 18. Transmission of information from the switching source mobile switching center 6 to the switching destination mobile switching center 7 in this instance is performed via the additional communication line 271.

Accordingly, this hand-over can be performed independently of an operator to which the switching source mobile switching center 6 and the switching destination mobile switching center 7 belong (a communication enterprise which owns a system which provides mobile communication services is normally called operator).

It is to be noted that, since the window of the public network 1 to the mobile station side in this instance is the mobile switching center 6 both before and after the hand-over, the public network 1 and the data base 2 need not be conscious of the hand-over.

Furthermore, where the additional communication lines 271 and 272 and the mobile switching centers 6 to 8 connected by them are of the ATM type, if the other party information of an additional header (101 of FIG. 6) of a packet to be transmitted to a radio base station to which the switching source mobile switching center 6 is connected is changed from the switching source base station 13 to the switching destination base station 21, then it is possible to set the switching source mobile switching center 6 and the switching destination mobile switching center 7 so that this packet may arrive at the switching destination base station 21 via the additional communication line 271 and the switching destination mobile switching center 7.

It is to be noted that, since this similarly applies to the additional communication line 272, description of it is omitted.

Here, if communication between the public network 1 and the mobile station 18 which has been performed in the intermediate form in which the communication is performed via the switching source mobile switching center 6, additional communication line 271, switching destination mobile switching center 7 and switching destination base station 21 is stopped once and thereafter the communication is resumed, the communication may not return to the intermediate form again, but communication between the mobile station 18 and the public network 1 may be performed via the switching destination base station 21 and the switching destination mobile switching center 7.

Further, if the mobile station 18 which has been handed over from the switching source base station 13 which belongs to the switching source mobile switching center 6 to the radio base station 21 which belongs to the mobile switching center 7 and further handed over to the radio base station 31 which belongs to the mobile switching center 8 is still continuing its communication also after the hand-over, information from the switching destination base station 31 which is communicating with the mobile station 18 at present is sent from the switching destination mobile switching center 8 to which the switching destination base station 31 belongs to the switching source mobile switching center 6 via the additional communication line 272, mobile switching center 7 and additional communication line 271 so that it is transmitted from the switching source mobile switching center 6 to the public network 1.

As described above, according to the present Embodiment 8, there is an effect that, since it is possible to make occurrence of hand-over independent of a public network by performing setting of a header which passes through an additional communication line which directly couples mobile switching centers to each other and the mobile switching centers, hand-over between radio base stations connected to the mobile switching centers which belong to different operators can be handled similarly to hand-over between radio base stations which belong to the same operator.

INDUSTRIAL APPLICABILITY OF THE INVENTION

As described above, a mobile communication system according to the present invention is effectively used for control of hand-over of a mobile station in a time slot sharing and frequency channel sharing mobile communication system wherein a mobile station and a radio base station are radio connected by an FDMA/TDD system, a multi-carrier TDMA system, a CDMA/TDD system, a time divided CDMA system or the like by a communication channel modulated by a digital modulation system and which has TDMA signals and time slot sharing and frequency channel sharing (including a case in which a frequency is not shared) time divided CDMA signals and has a controlling function of allocating those signals on a time base and a frequency base, and is effectively used for hand-over control in the mobile communication system wherein a mobile station and a radio base station which have a high speed data transmission function are radio connected to each other by a high speed data transmission channel.

What is claimed is:

1. A mobile communication system of a time-slot sharing and frequency channel sharing type, comprising:

a plurality of mobile stations;

a plurality of radio base stations, at least one of said plurality of radio base stations being radio-connected to said plurality of mobile stations using a multiple access system; and at least one mobile switching center comprising means for allocating time-division multiplexed signals and code division multiplexed signals of a time-slot sharing and frequency sharing type on a time base, and also allocating time-division multiplexed signals and code division multiplexed signals of a time-slot sharing type on a time base and a frequency base, said mobile switching center further comprising means for allocating frame sequence numbers to two down-link frames respectively transmitted to one of said mobile stations from two radio base stations adjacent to each other and connected to said mobile switching center, the frame sequence numbering being shared by the two radio base stations, wherein said mobile station comprises means for detecting the sequence numbers.

2. The mobile communication system according to claim 1, wherein said mobile switching center further comprises means for using the sequence numbers cyclically such that the sequence numbers are reset when the sequence numbers are equal to the number of frames constituting a multiframe or equal to integral multiples of the number of frames constituting a multiframe.

3. The mobile communication system according to claim 1, wherein said mobile station, in a hand-over transition from a source base station to a destination base station, detects, from received signals, a first sequence number contained in a down-link frame from the source base station and a second sequence number contained in a down-link frame from the destination base station, and compares the first sequence number with the second sequence number, so as to generate a repetition code in accordance with a difference between the first sequence number and the second sequence number and to transmit the repetition code thus generated to said mobile switching center via the source base station.

4. The mobile system according to claim 3, wherein when a signal transmitted from the destination base station is behind a signal transmitted from the source base station, the sequence code generated by said mobile station is a negative number and, when the signal transmitted from the destination base station is ahead of the signal transmitted from the source base station, the repetition code is a positive number.

5. The mobile communication system according to claim 1, wherein said mobile station, in a hand-over transition from a source base station to a destination base station, detects, from received signals, a first sequence number contained in a down-link frame from the source base station and a second sequence number contained in a down-link frame from the destination base station, and compares the first sequence number with the second sequence number, so as to discard, in the hand-over transition, as many items of time-slot information received from the destination base station as designated by a repetition code generated in accordance with a difference between the first sequence number and the second sequence number, the discarding being performed when it is determined that a signal transmitted from the destination base station is behind a signal transmitted from the source base station.

6. The mobile communication system according to claim 1, wherein said mobile switching center is implemented by an ATM switch and allocates the sequence numbers by adding a new header at a head of an ATM packet.

7. The mobile communication system according to claim 6, wherein, when the number of information bits contained in an ATM system packet transmitted via a public network is larger than the number of bits contained in a frame of a radio channel, said mobile switching center divides the ATM system packet so as to construct frames each containing the divided information and transmits the constructed frames to said radio base stations.

8. The mobile communication system according to claim 6, wherein, when the number of bits contained in a frame of a radio channel is larger than the number of information bits in an ATM system packet transmitted via a public network, said mobile switching center transmits the ATM system packet to said radio base stations without effecting any division.

9. The mobile communication according to claim 6, wherein a switch interface of said radio base station is of an ATM type.

10. The mobile communication system according to claim 1, wherein said mobile station, in a hand-over transition from a source base station to a destination base station, detects, from received signals, a first sequence number contained in a down-link frame from the source base station and a second sequence number contained in a down-link frame from the destination base station, and compares the first sequence number with the second sequence number, so as to generate a repetition code in accordance with a difference between the first sequence number and the second sequence number, and wherein
the destination base station, as a result of hand-over of said mobile station, stores as many items of time slot information already transmitted to said mobile station as are designated by the repetition code, when a signal transmitted from the destination base station is ahead of a signal transmitted from the source destination base station, and performs sequential transmission starting at the stored time-slot information items simultaneously with the completion of hand-over.

11. The mobile communication system according to claim 10, wherein said mobile switching center receives the repetition code generated by said mobile station via the source base station, and transmits the repetition code to the destination base station when it is determined that the hand-over is to be performed.

12. The mobile communication system according to claim 1, wherein said mobile station further comprises storage means for storing the time-slot information contained in the down-link frame.

13. The mobile communication system according to claim 1, wherein said radio base station further comprises storage means for storing the time slot information contained in the down-link frame.

14. A mobile communication system of a time-slot sharing and frequency channel sharing type, comprising:
a plurality of mobile stations including mobile stations having high-speed data transmission capability;
a plurality of radio base stations, at least one of said plurality of radio base stations being radio-connected to said plurality of mobile stations, including those of said plurality of mobile stations having high-speed data transmission capability, using a multiple access system; and
at least one mobile switching center comprising means for allocating time-division multiplexed signals and code division multiplexed signals of a time-slot sharing and frequency sharing type on a time base, and also allocating time-division multiplexed signals and code division multiplexed signals of a time-slot sharing type on a time base and a frequency base,
said mobile switching center further comprising means for allocating sequence numbers to micro-slot information in high-speed data transmission channels transmitted using two down-link frames respectively transmitted to one of said mobile stations from two radio base stations adjacent to each other and connected to said mobile switching center, the micro-slot sequence numbering being shared by the two radio base stations, wherein
said mobile station comprises means for detecting the sequence numbers.

15. The mobile communication system according to claim 14, wherein said mobile station, in a hand-over transition from a source base station to a destination base station, detects, from received signals, a first sequence number attached to the micro-slot information in the high-speed data transmission channel transmitted using the down-link frame from the source base station and a second sequence number attached to the micro-slot information in the high-speed data transmission channel transmitted using the down-link frame from the destination base station, and compares the first sequence number with the second sequence number, so as to generate a repetition code in accordance with a difference between the first sequence number and the second sequence number and to transmit the repetition code thus generated to said mobile switching center via the source base station.

16. The mobile communication system according to claim 14, wherein said mobile station, in a hand-over transition from a source base station to a destination base station, detects, from received signals, a first sequence number attached to the micro-slot information in the high-speed data transmission channel transmitted using the down-link frame from the source base station and a second sequence number attached to the micro-slot information in the high-speed data transmission channel using the down-link frame from the destination base station, and compares the first sequence number with the second sequence number, so as to discard, in the hand-over transition, as many items of micro-slot-information received from the destination base station as designated by a repetition code generated in accordance with a difference between the first sequence number and the second sequence number, the discarding being performed when it is determined that a signal transmitted from the destination base station is behind a signal transmitted from the source base station.

17. The mobile communication system according to claim 1, wherein said mobile station, in a hand-over transition from a source base station to a destination base station, detects, from received signals, a first sequence number attached to the micro-slot information in the high-speed data transmission channel transmitted using the down-link frame from the source base station and a second sequence number attached to the micro-slot information in the high-speed data transmission channel transmitted using the down-link frame from the destination base station, and compares the first sequence number with the second sequence number, so as to generate a repetition code in accordance with a difference between the first sequence number and the second sequence number, and wherein the destination base station, as a result of hand-over of said mobile station, stores as many items of time slot information already transmitted to said mobile station as are designated by the repetition code, when a signal transmitted from the destination base station is ahead of a signal transmitted from the source destination, and performs sequential transmission starting at the stored time-slot information items simultaneously with the completion of hand-over.

18. The mobile communication system according to claim 17, wherein said mobile switching center receives the repetition code generated by said mobile station via the source base station, and transmits the repetition code to the destination base station when it is determined that the hand-over is to be performed.

19. The mobile communication system according to claim 14, wherein said mobile station comprises storage means for storing the micro-slot information.

20. The mobile communication system according to claim 14, wherein said radio base station comprises storage means for storing the micro-slot information.

21. A mobile communication system of a time-slot sharing and frequency channel sharing type, comprising:
a plurality of mobile stations;
a plurality of radio base stations, at least one of said plurality of radio base stations being radio-connected to said plurality of mobile stations using a multiple access system; and
at least one mobile switching center comprising means for allocating time-division multiplexed signals and code division multiplexed signals of a time-slot sharing and frequency sharing type on a time base, and also allocating time-division multiplexed signals and code division multiplexed signals of a time-slot sharing type on a time base and a frequency base,
said at least one radio base station comprising means for allocating sequence numbers to time-slot information from one of said plurality of mobile stations when transmitting the time-slot information received from said mobile station to said mobile switching center connected to said radio base station, the sequence numbering being determined by a multiframe construction of a radio channel and shared by a radio base station adjacent to said at least one radio base station, wherein
said mobile switching center further comprises means for detecting the sequence numbers.

22. The mobile communication system according to claim 21, wherein said at least one radio base station further comprises means for using the sequence numbers cyclically such that the sequence number is reset when the sequence number is equal to the number of frames constituting a multiframe or equal to integral multiples of the number of frames constituting a multiframe.

23. The mobile communication system according to claim 21, wherein said at least one radio base station allocates the sequence numbers by adding a new header at a head of an information packet.

24. The mobile communication system according to claim 21, wherein said mobile switching center checks the sequence numbers contained in the header of the information packet carried in signals respectively transmitted from two radio base stations in a hand-over transition, and sequentially transmits the information packets to a public network such that the sequence numbers are properly arranged along a time line.

25. A mobile communication system of a time-slot sharing and frequency channel sharing type, comprising:
a plurality of mobile stations;
a plurality of radio base stations radio-connected to said plurality of mobile stations using a multiple access system; and
a plurality of mobile switching centers each comprising means for allocating time-division multiplexed signals and code division multiplexed signals of a time-slot sharing and frequency sharing type on a time base, and also allocating time-division multiplexed signals and code division multiplexed signals of a time-slot sharing type on a time base and a frequency base, wherein
said plurality of mobile switching centers are connected to a public-network and also connected to each other via additional communication circuits without using the public network.

26. The communication system according to claim 25, wherein, when a mobile station makes a hand-over transition to a destination base station connected to a second mobile switching center different from a first mobile switching center connected to a source base station, information from the destination base station communicating with said mobile station after the hand-over is transmitted from the mobile switching center connected to the destination base station to the mobile switching center connected to the source base station via the additional communication circuits so that the mobile switching center connected to the source base station transmits the transmitted information to the public network.

27. The mobile communication system according to claim 26, wherein, when the communication subsequent to the hand-over, in which the information from the destination base station communicating with said mobile station after the hand-over is transmitted to the mobile switching center connected to the source base station via the additional circuits so that the mobile switching center connected to the source base station transmits the transmitted information to the public network, is completed,
said mobile station resumes communication via the public network such that the information from said mobile station is directly transmitted to the public network via the destination base station and the mobile switching center connected to the destination base station.

28. The mobile communication system according to claim 25, wherein said plurality of mobile switching centers connected to each other via the additional communication circuits belong to different operators.

29. The mobile communication system according to claim 25, wherein said plurality of mobile switching centers connected to each other via the additional communication circuits are implemented by switches of an ATM type.

30. The mobile communication system according to claim 25, wherein the additional communication circuits connecting said plurality of mobile switching centers to each other are of an ATM type.

31. The mobile communication system according to claim 25, wherein, when said mobile station maintains communication after having made a transition between said two of said plurality of base stations respectively belonging to said plurality of mobile switching centers, the information from the destination base station communicating with said mobile station is transmitted to the public network, via the mobile switching center connected to the destination base station, the plurality of communication circuits and the mobile switching center connected to the source base station.

* * * * *